United States Patent
Resch et al.

(10) Patent No.: US 10,445,164 B2
(45) Date of Patent: Oct. 15, 2019

(54) COPYING DATA IN A DISPERSED STORAGE NETWORK WITHOUT REPLICATION

(75) Inventors: Jason K. Resch, Chicago, IL (US); Wesley Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 314 days.

(21) Appl. No.: 13/611,533

(22) Filed: Sep. 12, 2012

(65) Prior Publication Data
US 2013/0111166 A1    May 2, 2013

Related U.S. Application Data

(60) Provisional application No. 61/554,358, filed on Nov. 1, 2011.

(51) Int. Cl.
| | |
|---|---|
| G06F 12/00 | (2006.01) |
| G06F 11/07 | (2006.01) |
| H04L 1/00 | (2006.01) |
| G06F 11/10 | (2006.01) |
| G06F 21/62 | (2013.01) |
| H04L 29/08 | (2006.01) |

(52) U.S. Cl.
CPC ........ *G06F 11/073* (2013.01); *G06F 11/1076* (2013.01); *G06F 21/62* (2013.01); *H04L 1/0057* (2013.01); *H04L 1/0061* (2013.01); *H04L 67/1097* (2013.01); *G06F 2211/1028* (2013.01); *H04L 1/0072* (2013.01); *H04L 1/0083* (2013.01)

(58) Field of Classification Search
CPC .......... G06F 11/1453; G06F 17/30159; G06F 12/12; G06F 12/0646; G06F 2212/1008; G06F 2212/657; G06F 3/0608; G06F 3/0641; G06F 17/30156; G06F 11/1076
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Arvind Talukdar
(74) *Attorney, Agent, or Firm* — Garlick & Markison; Edward J. Marshall

(57) ABSTRACT

A method begins by a dispersed storage (DS) processing module receiving a request to copy a data object in a dispersed storage network (DSN). The method continues with the DS processing module identifying one or more sets of at least a decode threshold number of slice names for one or more sets of encoded data slices of the data object and generating one or more sets of at least a decode threshold of new slice names. The method continues with the DS processing module sending the one or more sets of at least a decode threshold of new slice names to storage nodes of the DSN and instructing the storage nodes to link the one or more sets of at least a decode threshold of new slice names to the one or more sets of encoded data slices thereby producing a non-replicated copy of the data object.

10 Claims, 28 Drawing Sheets

(56) References Cited

U.S. PATENT DOCUMENTS

| | | | |
|---|---|---|---|
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,574,657 B1 * | 6/2003 | Dickinson | G06F 8/68 707/999.001 |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,041,641 B1 * | 10/2011 | Panchbudhe et al. | 705/52 |
| 8,572,055 B1 * | 10/2013 | Wu et al. | 707/697 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0155169 A1 * | 6/2008 | Hiltgen | G06F 9/5077 711/6 |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0250858 A1 * | 9/2010 | Cremelie et al. | 711/136 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner computing system 10

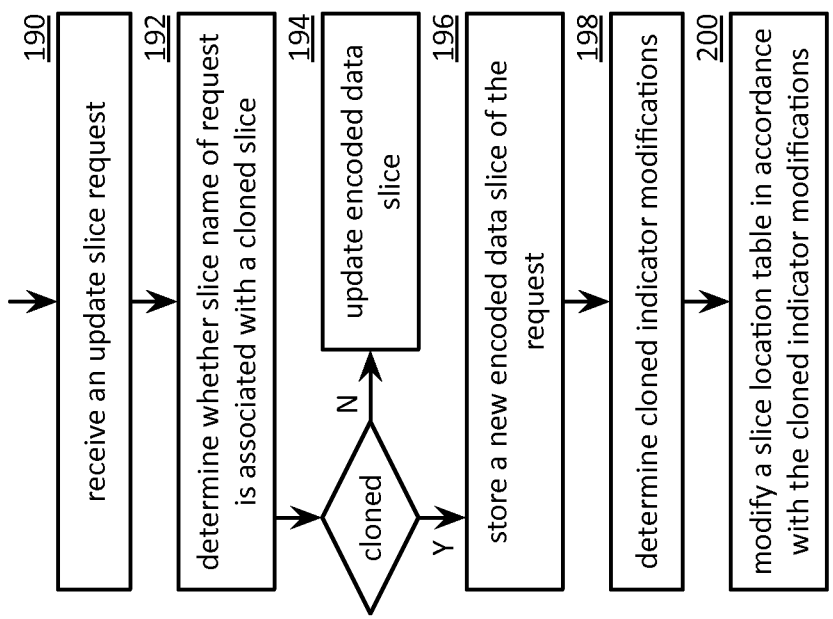

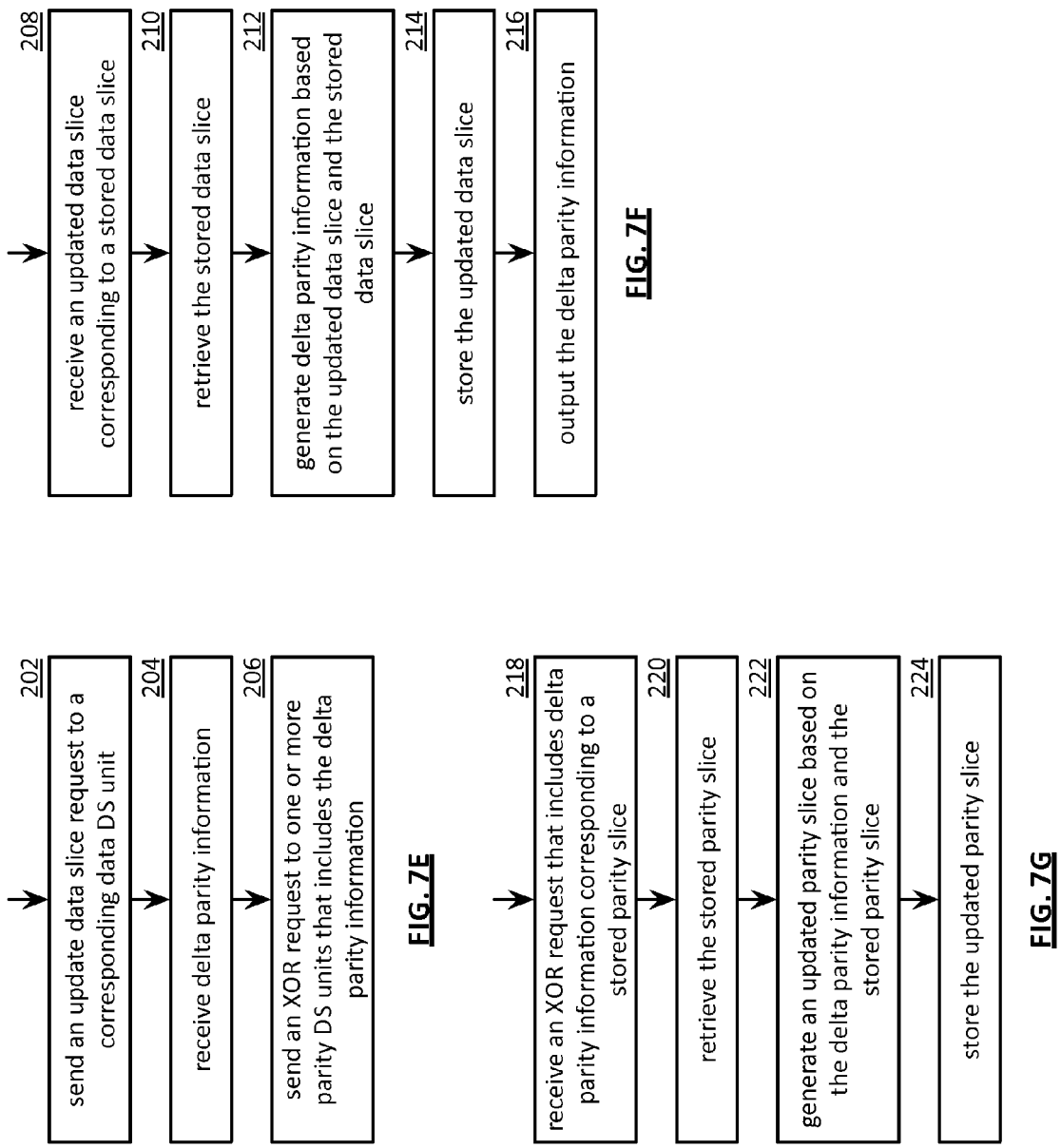

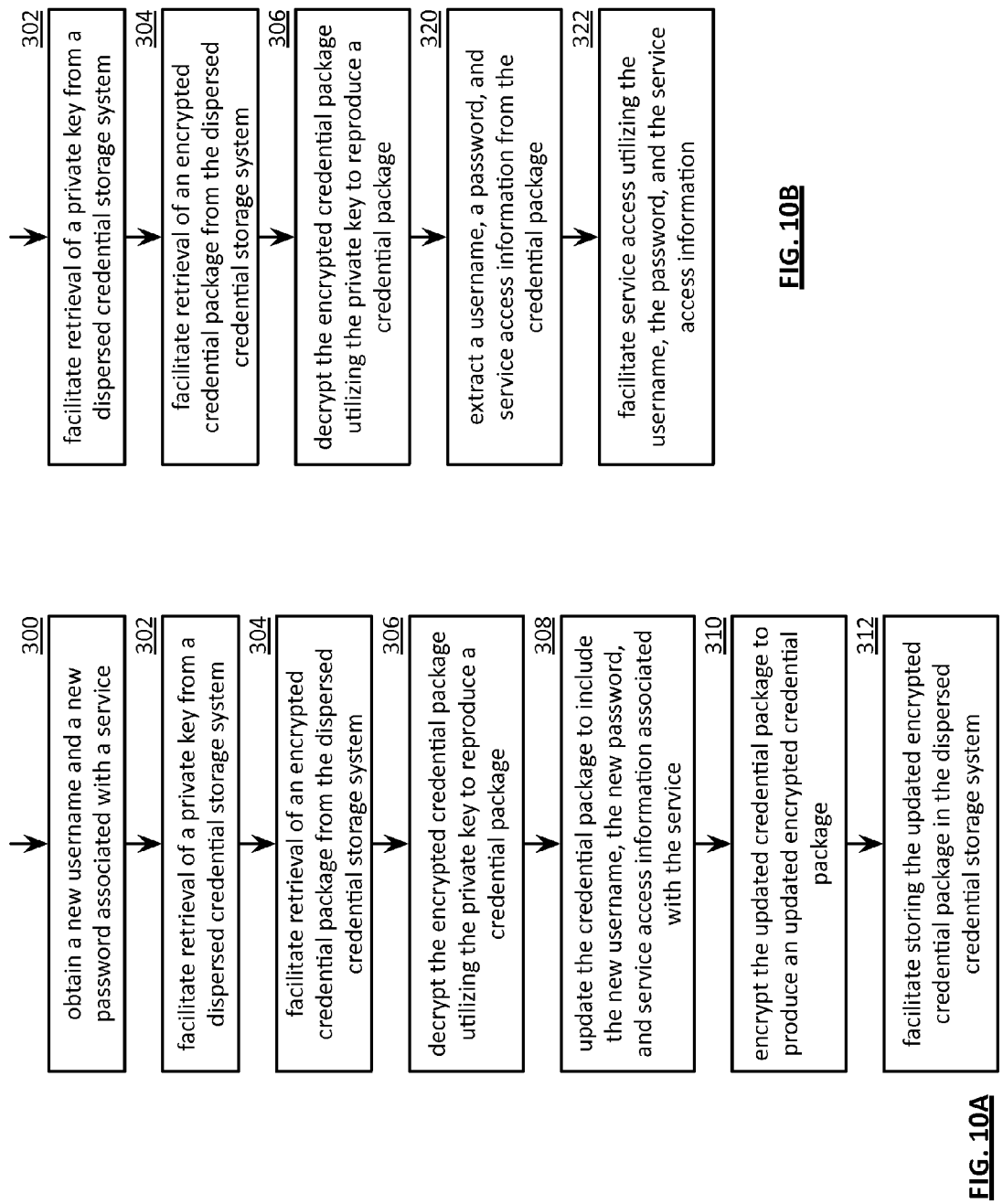

slice name 380

| slice index 382 | vault info 384 | | | | object number 386 | segment number 388 |
|---|---|---|---|---|---|---|
| | vault ID 390 | vault region 392 | vault gen 394 | | | |
| 1 | A03 | 1 | 1 | | F4D766 | 1 |
| 2 | A03 | 1 | 1 | | F4D766 | 1 |
| 3 | A03 | 1 | 1 | | F4D766 | 1 |
| 4 | A03 | 1 | 1 | | F4D766 | 1 |
| 1 | A03 | 2 | 1 | | F4D766 | 1 |
| 2 | A03 | 2 | 1 | | F4D766 | 1 |
| 3 | A03 | 2 | 1 | | F4D766 | 1 |
| 4 | A03 | 2 | 1 | | F4D766 | 1 |

•••

FIG. 11B vault parameter table 396

| vault region 398 | vault region parameters 400 |
|---|---|
| 1 | IDA 3, n=36, k=22, WT=34, DS unit pool 3 |
| 2 | IDA 5, n=4, k=3, WT=3, DS unit pool 4 |
| 3 | IDA 6, n=16, k=10, WT=12, DS unit pool 8 |

FIG. 11C

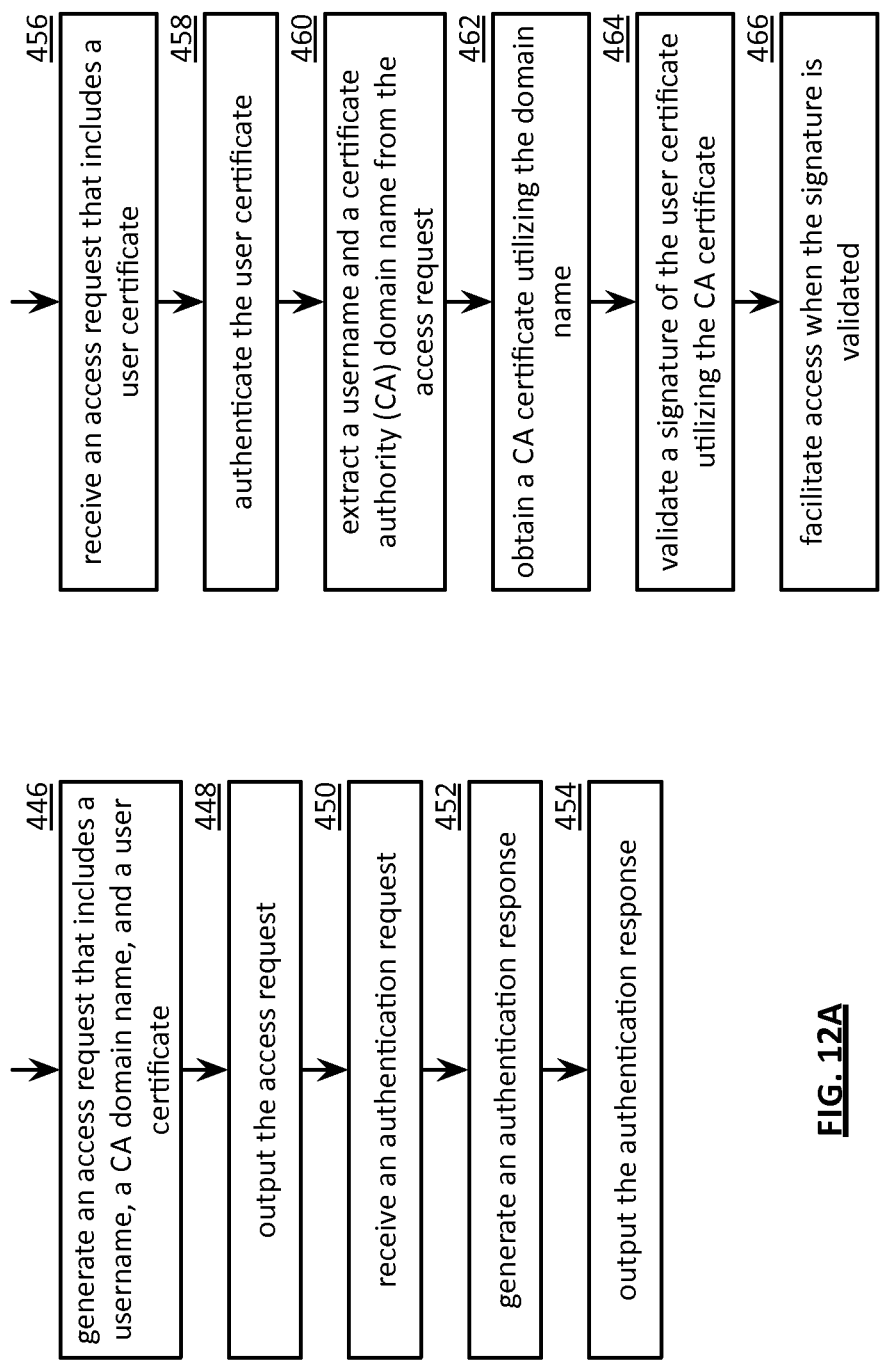

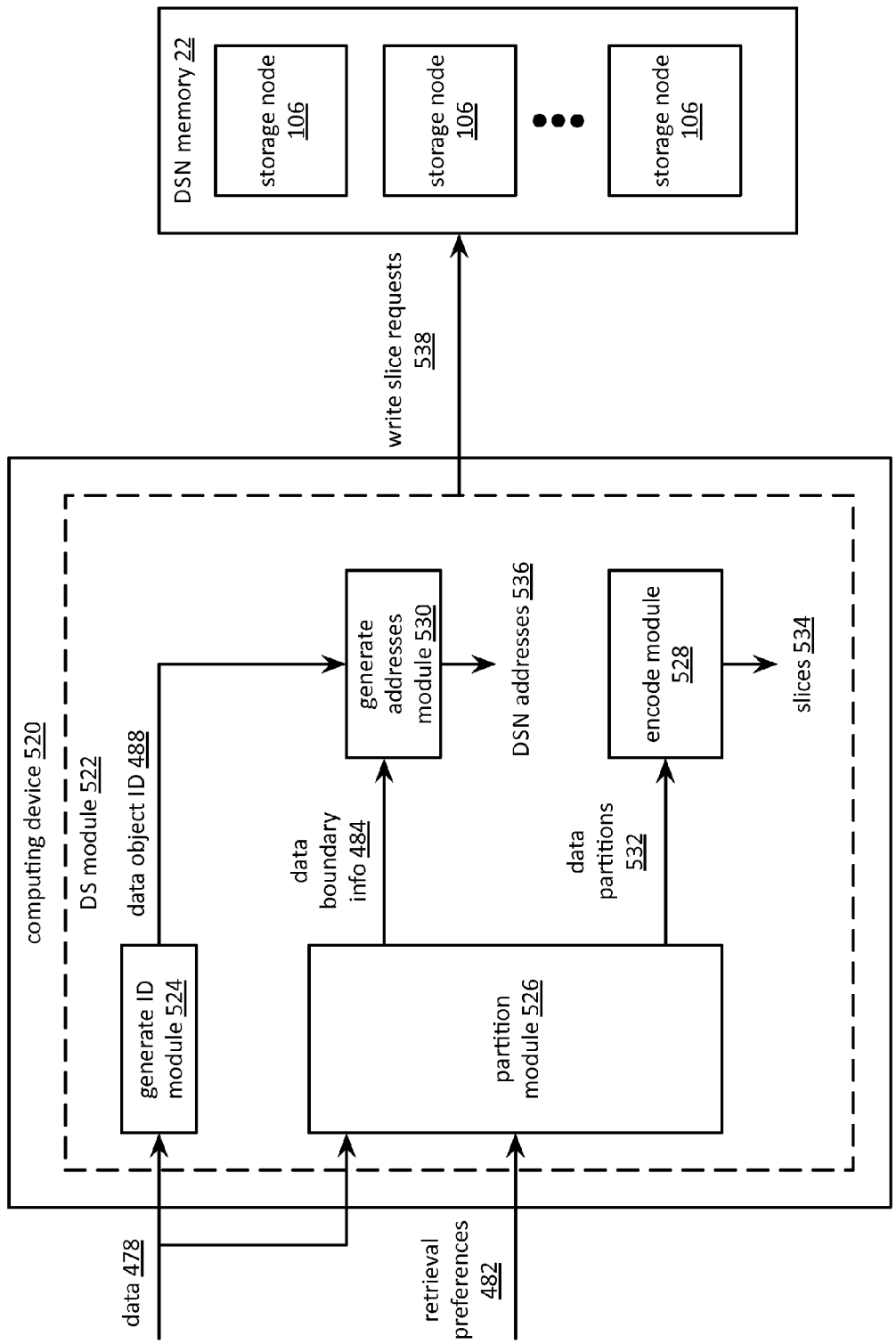

COPYING DATA IN A DISPERSED STORAGE NETWORK WITHOUT REPLICATION

CROSS REFERENCE TO RELATED PATENTS

The present U.S. Utility Patent Application claims priority pursuant to 35 U.S.C. § 119(e) to U.S. Provisional Application No. 61/554,358, entitled "Accessing a Dispersed Storage Network", filed Nov. 1, 2011, pending, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 6G is a diagram of another slice location table in accordance with the present invention;

FIG. 6H is a flowchart illustrating an example of updating a slice in accordance with the present invention;

FIG. 7E is a flowchart illustrating an example of updating data storage in accordance with the present invention;

FIG. 7F is a flowchart illustrating an example of storing updated data in accordance with the present invention;

FIG. 7G is a flowchart illustrating an example of generating an updated parity slice in accordance with the present invention;

FIG. 10A is a flowchart illustrating an example of establishing access to a legacy service in accordance with the present invention;

FIG. 10B is a flowchart illustrating an example of accessing a legacy service in accordance with the present invention;

FIG. 11B is a diagram illustrating an example of a slice name in accordance with the present invention;

FIG. 11C is a diagram illustrating an example of a vault in accordance with the present invention;

FIG. 12A is a flowchart illustrating another example of generating an access request in accordance with present invention;

FIG. 12B is a flowchart illustrating another example of processing an access request in accordance with present invention;

FIG. 13C is a schematic block diagram of another embodiment of a system for storing a large data object in a dispersed storage network (DSN) in accordance with the present invention;

DETAILED DESCRIPTION OF THE INVENTION

Figure 1:
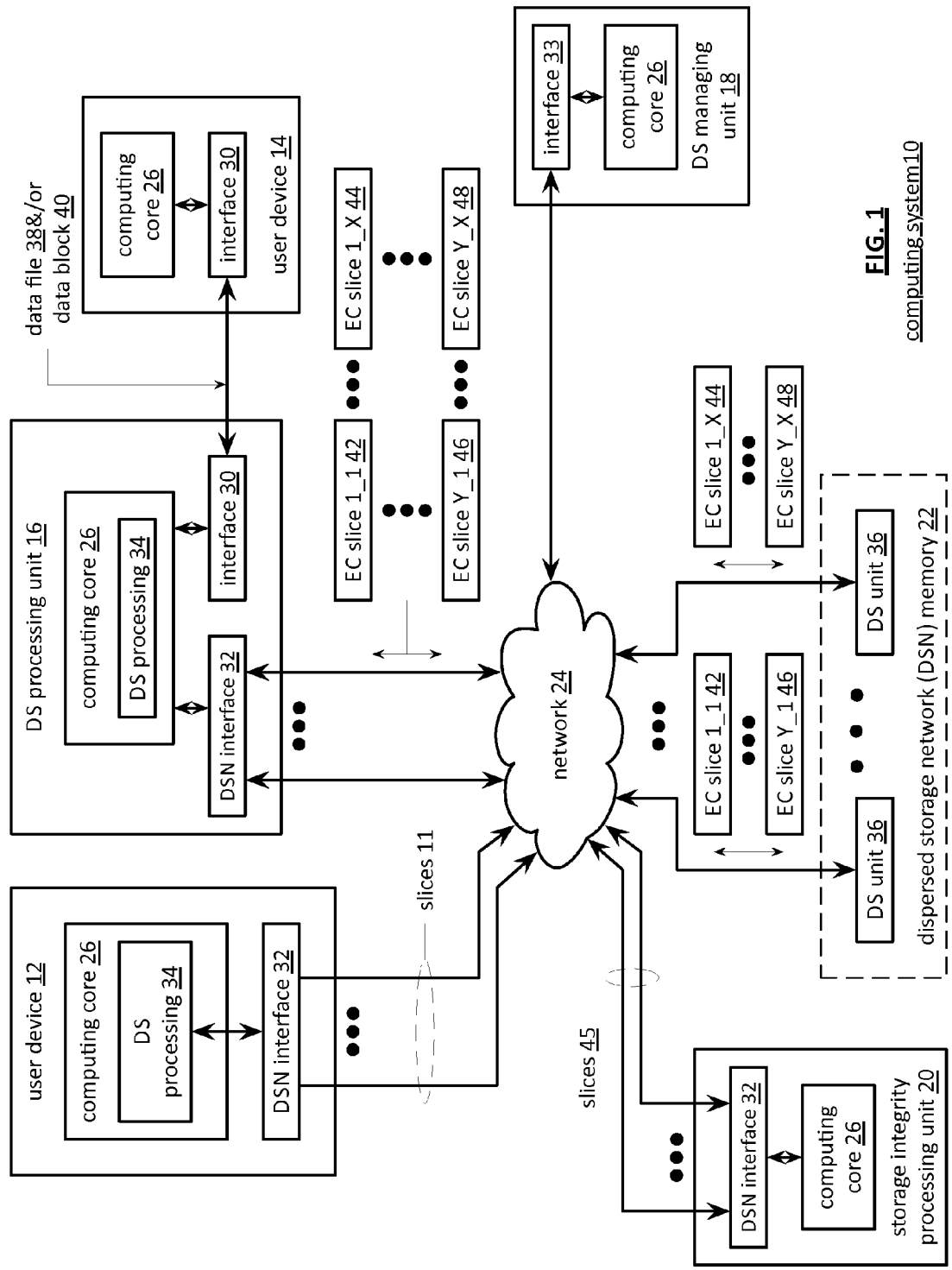
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
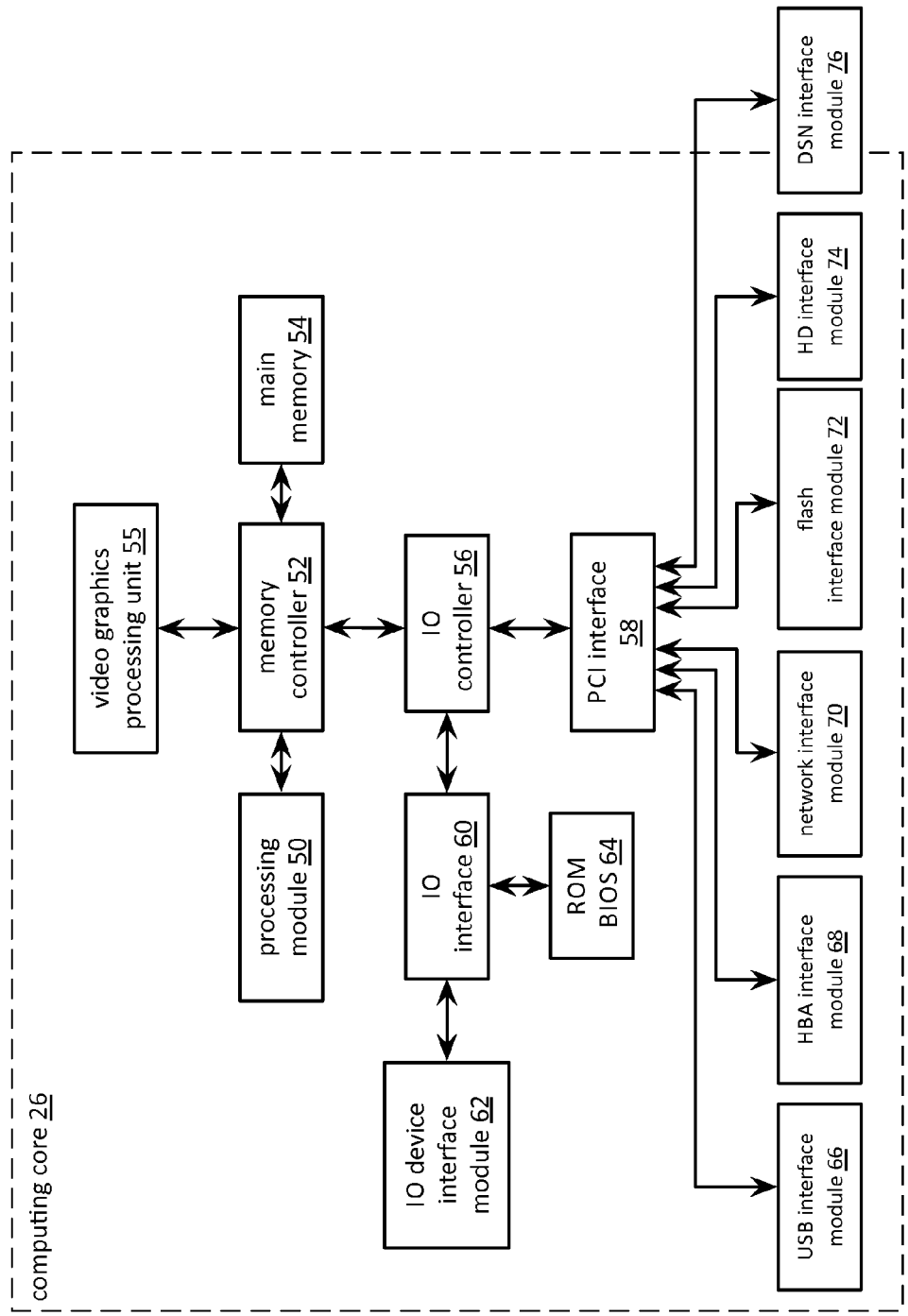
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
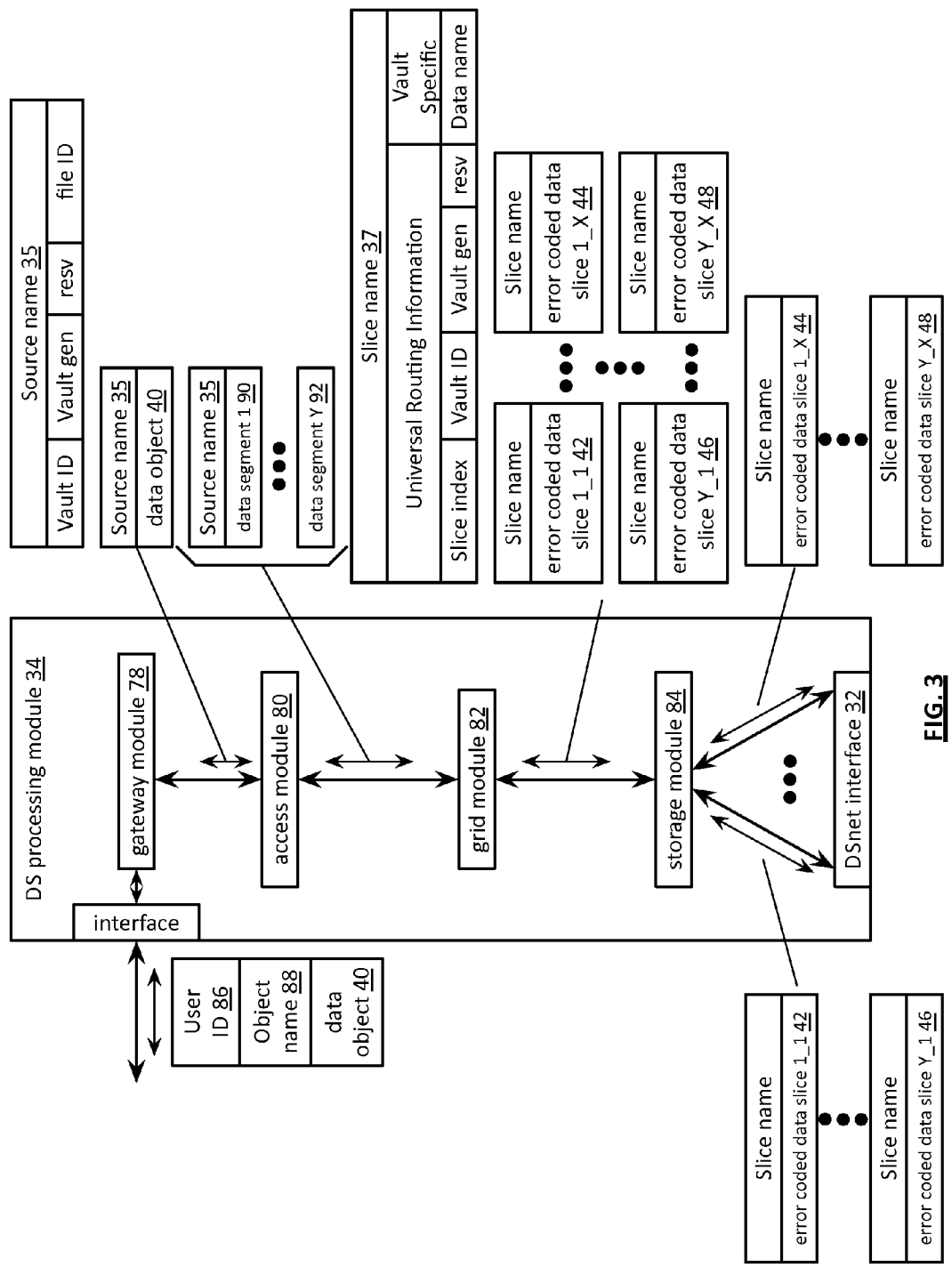
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
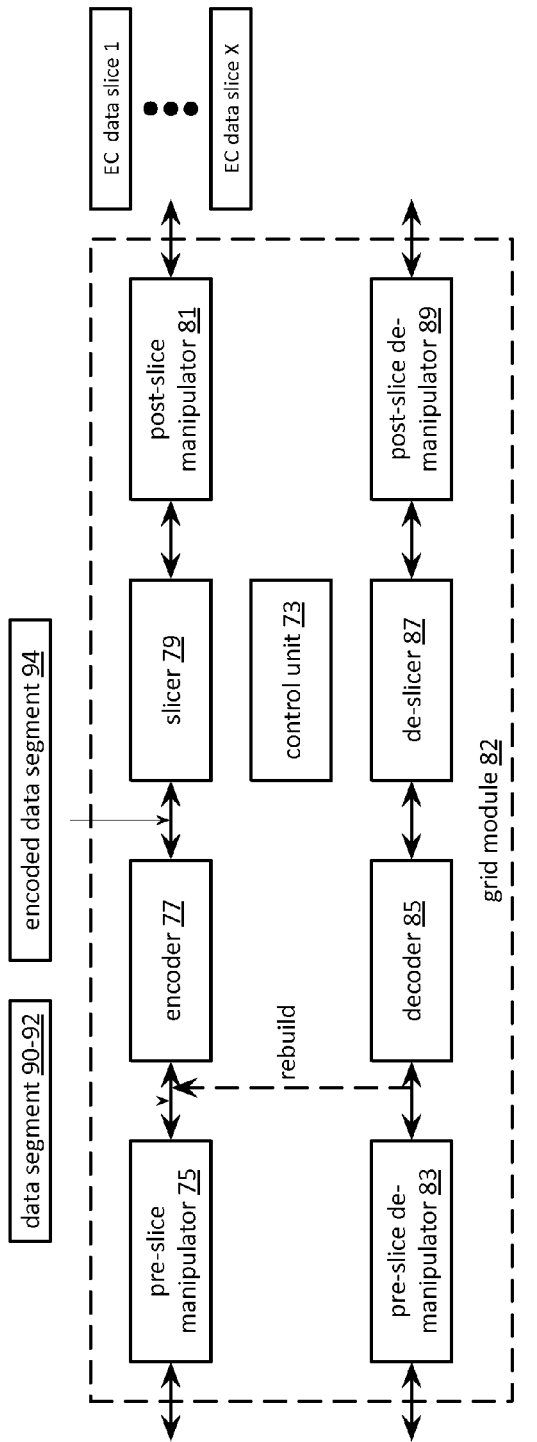
FIG. 4 is a schematic block diagram of an embodiment of a grid module in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
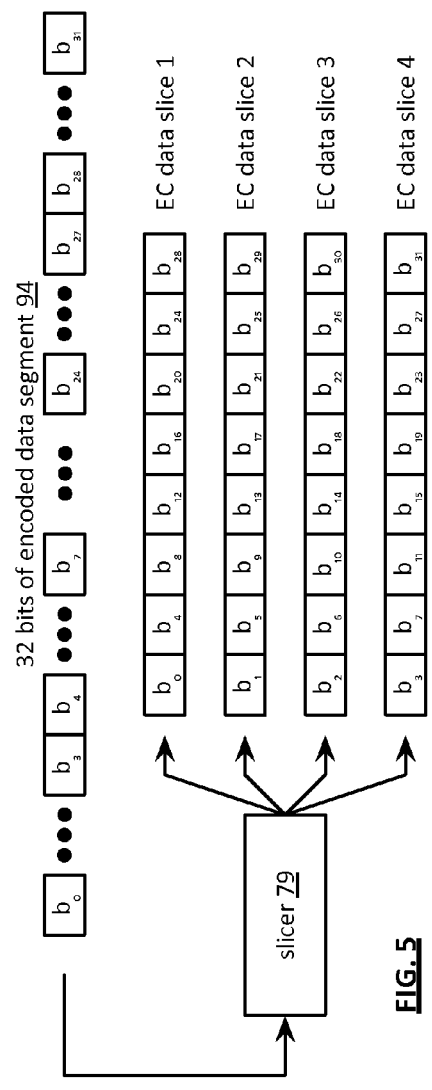
FIG. 5 is a diagram of an example embodiment of error coded data slice creation in accordance with the present invention.

FIG. 5 is a diagram of an example of slicing an encoded data segment 94 by the slicer 79. In this example, the encoded data segment 94 includes thirty-two bits, bytes, data words, etc., but may include more or less bits, bytes, data words, etc. The slicer 79 disperses the bits of the encoded data segment 94 across the EC data slices in a pattern as shown. As such, each EC data slice does not include consecutive bits, bytes, data words, etc. of the data segment 94 reducing the impact of consecutive bit, byte, data word, etc. failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
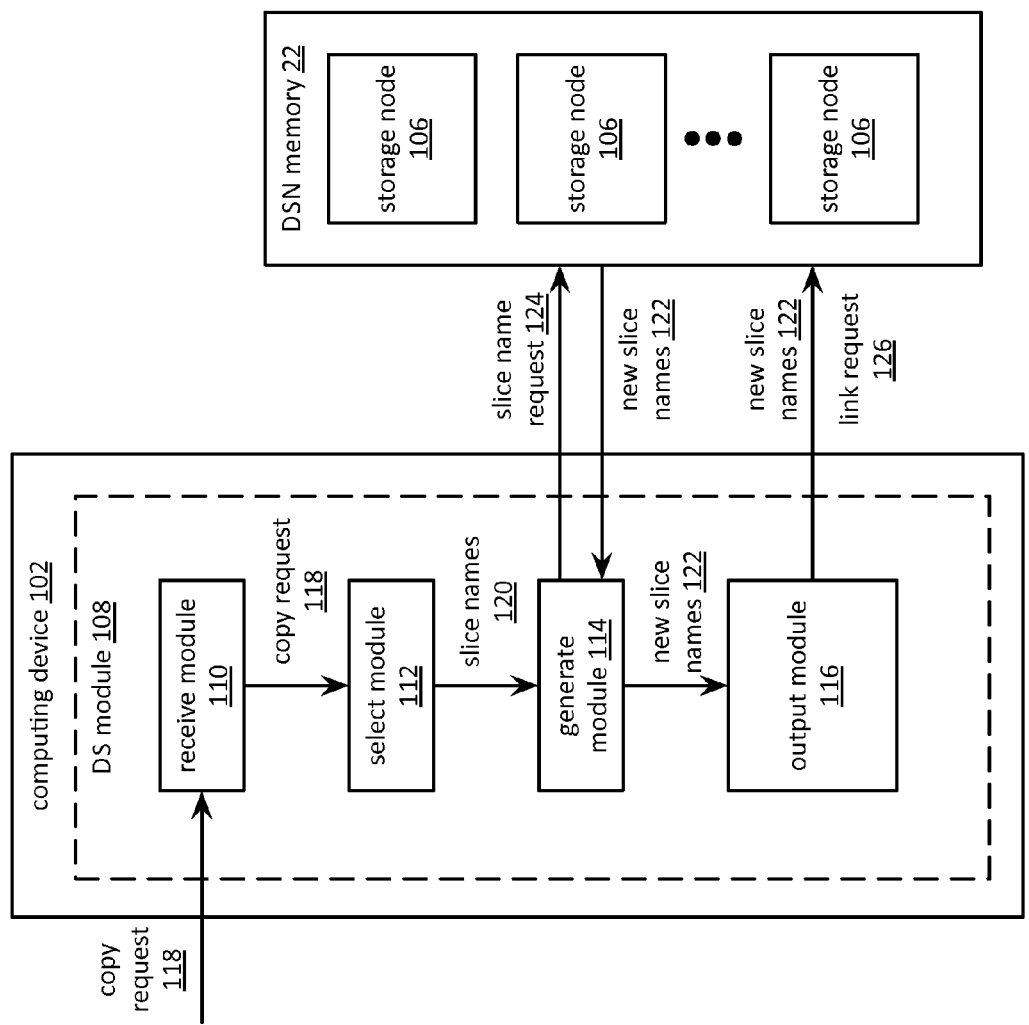
FIG. 6A is a schematic block diagram of another embodiment of a computing system in accordance with the present invention.

FIG. 6A is a schematic block diagram of another embodiment of a computing system that includes a computing device 102 and a dispersed storage network (DSN) memory 22. The DSN memory 22 includes a plurality of storage nodes 106. Each storage node 106 of the plurality of storage nodes 106 may be implemented utilizing at least one of a dispersed storage (DS) unit, a storage server, a DS processing unit, and a user device. The computing device 102 includes a DS module 108. The DS module 108 includes a receive module 110, a select module 112, a generate module 114, and an output module 116.

The receive module 110 receives a request to copy a data object 118. The data object is stored in the DSN number 22 as a one or more sets of encoded data slices based on a dispersed storage error coding function. The request to copy 118 includes at least one of a snapshot request (e.g., to document a copy of the data object), a component of a duplication request (e.g., to store same data without replication to affect de-duplication), and a component of a backup request. The backup request may include an initial phase of a backup process. The backup process may include increasing a pillar width parameter of the dispersed storage error coding function to add additional encoded data slices while producing the non-replicated copy of the data object.

In response to the request to copy the data object, the select module 112 identifies one or more sets of at least a decode threshold number of slice names 120 for the one or more sets of encoded data slices. For example, the select module 112 extracts a data identifier from the request to copy the data object. The select module 112 accesses a directory utilizing the data identifier to identify the one or more sets of at least a decode threshold number of slice names 120 (e.g., identifying a source name and determining the slice names based on the source name).

The generate module 114 generates one or more sets of at least a decode threshold of new slice names 122 for the one or more sets of encoded data slices. The generate module 114 generates the one or more sets of at least a decode threshold of new slice names 122 by generating the one or more sets of at least a decode threshold of new slice names 122 in accordance with the dispersed storage error coding function. The one or more sets of at least a decode threshold of new slice names 122 may include several identical values for fields as the one or more sets of at least a decode threshold number of slice names. For example, the identical values for fields including a pillar index field, a segment number field, and a vault ID field. The one or more sets of at least a decode threshold of new slice names 122 includes non-identical values for other fields including an object number field. The object number field may be generated based on one or more of a random number, a fixed offset, and a deterministic value of an element associated with the copy (e.g., a hashing function value of a snapshot number).

Alternatively, or in addition to, the generate module 114 generates the one or more sets of at least a decode threshold of new slice names 122 by sending a request to generate the one or more sets of new slices names 124 to the storage nodes 106. In response, a first storage node 106 of the storage nodes 106 generates a first slice name (e.g., of a first pillar associated with the first storage node 106) for each of the one or more sets of at least a decode threshold of new slice names 122 in accordance with the dispersed storage error coding function. A second storage node 106 of the storage nodes 106 generates a second slice name (e.g., of a second pillar associated with the second storage node 106) for each of the one or more set of at least a decode threshold of new slice names 122 in accordance with the dispersed storage error coding function.

The output module 116 sends the one or more sets of at least a decode threshold of new slice names 122 to storage nodes of the DSN for storage therein. The output module 116 instructs the storage nodes 106 to link the one or more sets of at least a decode threshold of new slice names 122 to the one or more sets of encoded data slices thereby producing a non-replicated copy of the data object. The output module 116 sends a link request 126 to the storage nodes 106 to perform the linking. The link request 126 includes one or more of the one or more sets of at least a decode threshold of new slice names 122, the one or more sets of at least a decode threshold of slice names 120, and a clone request opcode.

The output module 116 instructs to link by instructing the first storage node 106 of the storage nodes 106 to update a first slice location table to link a first new slice name of the one or more sets of at least a decode threshold of new slice names 122 to a first slice name of the one or more sets of at least a decode threshold of slice names 120 for a first encoded data slice of the one or more sets of encoded data slices. The output module 116 instructs a second storage node 106 of the storage nodes 106 to update a second slice location table to link a second new slice name of the one or more sets of at least a decode threshold of new slice names 122 to a second slice name of the one or more sets of at least a decode threshold of slice names 120 for a second encoded data slice of the one or more sets of encoded data slices.

Figure 6B:
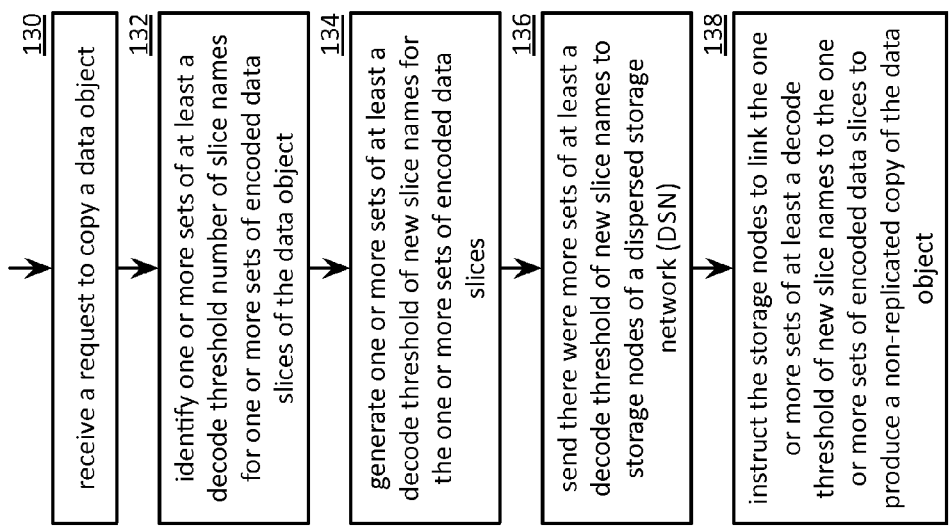
FIG. 6B is a flowchart illustrating an example of copying data in accordance with the present invention.

FIG. 6B is a flowchart illustrating an example of copying data. The method begins at step 130 where a processing module (e.g., of a dispersed storage (DS) processing unit) receives a request to copy a data object. The data object is stored in a dispersed storage network (DSN) as a one or more sets of encoded data slices based on a dispersed storage error coding function. The request to copy includes at least one of a snapshot request, a component of a duplication request, a data identifier, and a component of a backup request. In response to the request to copy the data object, the method continues at step 132 where the processing module identifies one or more sets of at least a decode threshold number of slice names for the one or more sets of encoded data slices (e.g., a directory lookup based on the data identifier of the request).

The method continues at step 134 where the processing module generates one or more sets of at least a decode threshold of new slice names for the one or more sets of encoded data slices. The generating the one or more sets of at least a decode threshold of new slice names includes generating the one or more sets of at least a decode threshold of new slice names in accordance with the dispersed storage error coding function. Alternatively, or in addition to, the generating the one or more sets of at least a decode threshold of new slice names includes sending a request to generate the one or more sets of new slices names to the storage nodes. A first storage node of the storage nodes generates a first slice name for each of the one or more sets of at least a decode threshold of new slice names in accordance with the dispersed storage error coding function. A second storage node of the storage nodes generates a second slice name for each of the one or more set of at least a decode threshold of new slice names in accordance with the dispersed storage error coding function.

The method continues at step 136 where the processing module sends the one or more sets of at least a decode threshold of new slice names to storage nodes of the DSN for storage therein. The method continues at step 138 where the processing module instructs the storage nodes to link the one or more sets of at least a decode threshold of new slice names to the one or more sets of encoded data slices thereby producing a non-replicated copy of the data object. For example, the processing module generates and sends a clone request to the storage nodes. The instructing to link includes instructing a first storage node of the storage nodes updating a first slice location table to link a first new slice name of the one or more sets of at least a decode threshold of new slice names to a first slice name of the one or more sets of at least a decode threshold of slice names for a first encoded data slice of the one or more sets of encoded data slices. The instructing to link further includes instructing a second storage node of the storage nodes updating a second slice location table to link a second new slice name of the one or more sets of at least a decode threshold of new slice names to a second slice name of the one or more sets of at least a decode threshold of slice names for a second encoded data slice of the one or more sets of encoded data slices.

Figures 6C, 6D:
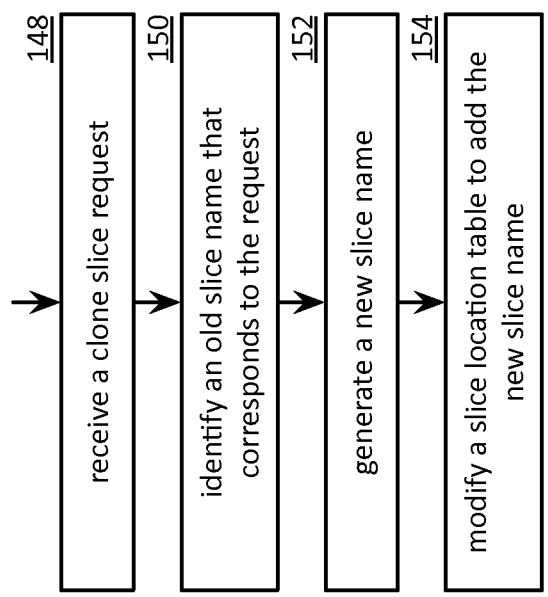
FIG. 6C is a diagram of a slice location table in accordance with the present invention.
FIG. 6D is a flowchart illustrating an example of cloning a slice in accordance with the present invention.

FIG. 6C is a diagram of a slice location table structure 140 that includes a slice name field 142, a cloned indicator field 144, and a location field 146. The slice name field 142 includes a plurality of slice name entries, wherein the slice name entries corresponds to a plurality of encoded data slices stored in a dispersed storage network (DSN) memory. The cloned indicator field 144 includes a plurality of cloned indicator entries, wherein the cloned indicator entries corresponds to the plurality of encoded data slices. Each cloned indicator entry indicates whether a corresponding encoded data slice is cloned (e.g., copied without replication) or not cloned. For example, the cloned indicator entry indicates yes to indicate that the corresponding encoded data slice is cloned and indicates no to indicate that the corresponding encoded data slices not cloned. The location field 146 includes a plurality of location entries, wherein the location entries corresponds to one or more DSN memory storage locations of the plurality of encoded data slices. The DSN memory storage location may include one or more of a dispersed storage (DS) unit identifier (ID), a memory ID, an absolute memory address, and a memory address offset.

Encoded data slices that are different may be stored at different locations. For example, an encoded data slice corresponding to slice name DC56 is not cloned and is stored at location A836 and another encoded data slice corresponding to slice name DC60 is cloned with other encoded data slices and is stored at location D341. Encoded data slices that are the same may be stored at the same location to provide a storage efficiency improvement. For example, the encoded data slice corresponding to slice name DC60 is cloned with other encoded data slices and is stored at location D341, encoded data slice corresponding to slice name DC61 is cloned with other encoded data slices and is also stored at location D341. As such, one copy of encoded data slices stored at location D341 and two different slice names point to the same encoded data slice. An encoded data slice may be cloned any number of times. As such, any number of slice names may point to an encoded data slice stored at the same location. For example, slice names DC70, DC78, DC89 point a cloned encoded data slice stored at location 3B5.

An encoded data slice may be cloned to provide a snapshot of a revision of data being stored and/or for the data being stored at a particular time. For example, a first encoded data slice is stored in the DSN memory at location 1 at time=t1 utilizing slice name A and indicating not cloned. A snapshot of the encoded data slice is provided at time t=2 by cloning the encoded data slice adding slice name B to the slice location table pointing to location 1 and indicating cloned. In addition, the slice location table is updated such that slice name A also indicates cloned and is still pointing to location 1. Next, the encoded data slice is updated for slice name A and stored at a location 2. The slice location table is updated such that slice name A points to location 2 and indicates not cloned and slice name B still points to location 1 and indicates not cloned.

FIG. 6D is a flowchart illustrating an example of cloning a slice. The method begins at step 148 where a processing module (e.g., of a dispersed storage (DS) unit) receives a clone slice request and/or a link request. The request includes one or more of a slice name, a start slice name, an end slice name, a slice name field wildcard indicator, a source name, and a new slice name indicator (e.g., increment, absolute number).

The method continues at step 150 where the processing module identifies an old slice name that corresponds to the request. The identification is based on one or more of the request and a slice location table lookup. For example, the processing module matches a slice name of the request to a slice name of the slice location table to identify the old slice name.

The method continues at step 152 where the processing module generates a new slice name. The generation is based on one or more of a corresponding old slice name and the new slice name indicator. For example, the processing module adds a slice name offset increment to the old slice name to produce the new slice name when the new slice name indicator includes the slice name offset increment. As another example, the processing module utilizes an absolute number of the new slice name indicator as the new slice name.

The method continues at step 154 where the processing module modifies the slice location table to add the new slice name. The modification includes one or more of adding a new entry that includes the new slice name, a cloned indicator entry to indicate cloned, and a slice location entry that corresponds to a slice location of an encoded data slice of the old slice name. Alternatively, the new entry includes a pointer from the new slice name to the old slice name. A cloned entry associated with the old slice name is updated to indicate cloned when the indicator indicates not cloned (e.g., first cloning).

Figure 6E:
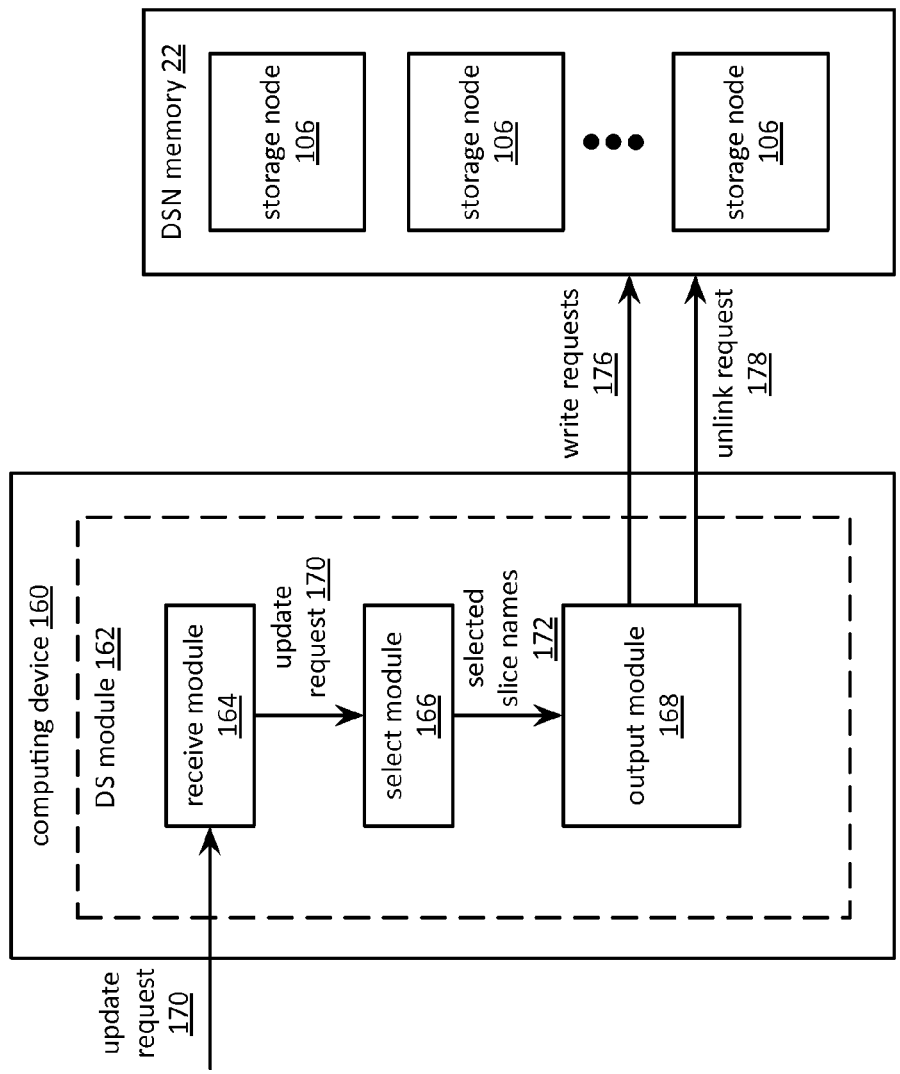
FIG. 6E is a schematic block diagram of another embodiment of a computing system in accordance with the present invention.

FIG. 6E is a schematic block diagram of another embodiment of a computing system that includes a computing device 160 and a dispersed storage network (DSN) memory 22. The DSN memory 22 includes a plurality of storage nodes 106. Each storage node 106 of the plurality of storage nodes 106 may be implemented utilizing at least one of a dispersed storage (DS) unit, a storage server, a DS processing unit, and a user device. The computing device 160 includes a DS module 162. The DS module 162 includes a receive module 164, a select module 166, and an output module 168.

The receive module 164 receives a request 170 to update a data object. The data object is stored in the DSN memory 22 as a one or more sets of encoded data slices based on a dispersed storage error coding function. The one or more sets of encoded data slices are identified by a first one or more sets of at least a decode threshold of slice names and a second one or more sets of at least a decode threshold of slice names. The request 170 to update the data object includes an updated data object, a data identifier, and one or more of a source name associated with the data object, slice names associated with the data object, and a cloned indicator.

The select module 166 selects the first or the second one or more sets of at least a decode threshold of slice names for the update to the data object to produce a selected one or more sets of at least a decode threshold of slice names 172. The select module 166 selects the first or the second one or more sets of at least a decode threshold of slice names by at least one of a variety of approaches. A first approach includes selecting the first or the second one or more sets of at least a decode threshold of slice names based on the request for updating (e.g., request includes appropriate slice names). A second approach includes selecting the first or the second one or more sets of at least a decode threshold of slice names based on chronological creation of the first and the second one or more sets of at least a decode threshold of slice names (e.g., update oldest). A third approach includes selecting the first or the second one or more sets of at least a decode threshold of slice names based on a snapshot procedure (e.g., receive a snapshot request).

The output module 168 sends one or more sets of updated encoded data slices regarding the update to the data object to storage nodes 106 of the DSN memory 22. The storage nodes 106 store the one or more sets of updated encoded data slices in new storage locations addressable based on the selected one or more sets of at least a decode threshold of slice names 172. The output module 168 generates the one or more sets of updated encoded data slices regarding the update to the data object in accordance with the dispersed storage error coding function. The sending includes the output module 168 sending write requests 174 to the storage nodes for storing the one or more sets of updated encoded data slices.

The output module 168 instructs the storage nodes to unlink the selected one or more sets of at least a decode threshold of slice names from the one or more sets of encoded data slices (e.g., to indicate not cloned). For example, the output module 168 generates and sends an unlink request 178 to the storage nodes. The output module 168 instructs the unlinking by instructing a first storage node of the storage nodes updating a first slice location table to unlink a first slice name of the first one or more sets of at least a decode threshold of slice names from a first slice name of the second one or more sets of at least a decode threshold of slice names for a first encoded data slice of the one or more sets of encoded data slices. The output module 168 further instructs the unlinking by instructing a second storage node of the storage nodes updating a second slice location table to unlink a second slice name of the first one or more sets of at least a decode threshold of new slice names from a second slice name of the second one or more sets of at least a decode threshold of slice names for a second encoded data slice of the one or more sets of encoded data slices.

Figure 6F:
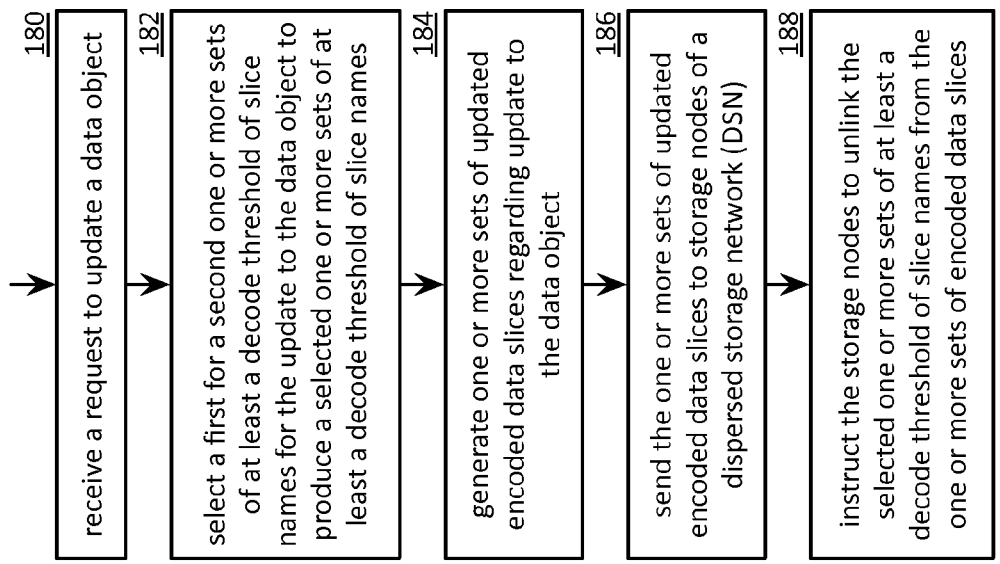
FIG. 6F is a flowchart illustrating an example of updating data in accordance with the present invention.

FIG. 6F is a flowchart illustrating an example of updating data. The method begins with step 180 where a processing module (e.g., of a dispersed storage (DS) processing unit) receives a request to update a data object. The data object is stored in a dispersed storage network (DSN) as a one or more sets of encoded data slices based on a dispersed storage error coding function. The one or more sets of encoded data slices are identified by a first one or more sets of at least a decode threshold of slice names and a second one or more sets of at least a decode threshold of slice names (e.g., two or more sets of slice names point to the same data when the data is cloned without replication).

The method continues at step 182 where the processing module selects the first or the second one or more sets of at least a decode threshold of slice names for the update to the data object to produce a selected one or more sets of at least a decode threshold of slice names. The selecting the first or the second one or more sets of at least a decode threshold of slice names includes at least one of a variety of approaches. A first approach includes selecting the first or the second one or more sets of at least a decode threshold of slice names based on the request for updating (e.g., request includes appropriate slice names). A second approach includes selecting the first or the second one or more sets of at least a decode threshold of slice names based on chronological creation of the first and the second one or more sets of at least a decode threshold of slice names (e.g., update oldest). A third approach includes selecting the first or the second one or more sets of at least a decode threshold of slice names based on a snapshot procedure. (e.g., receive a snapshot request).

The method continues at step 184 where the processing module generates one or more sets of updated encoded data slices regarding the update to the data object in accordance with a dispersed storage error coding function. For example, the processing module encodes the updated data object utilizing the dispersed storage error coding function to produce the one or more sets of updated encoded data slices. The method continues at step 186 where the processing module sends the one or more sets of updated encoded data slices regarding the update to the data object to storage nodes of the DSN. The sending includes generating and sending write requests to the storage nodes for storing the one or more sets of updated encoded data slices. The write requests includes the one or more sets of updated encoded data slices. The storage nodes store the one or more sets of updated encoded data slices in new storage locations addressable based on the selected one or more sets of at least a decode threshold of slice names.

The method continues at step 188 where the processing module instructs the storage nodes to unlink the selected one or more sets of at least a decode threshold of slice names from the one or more sets of encoded data slices (e.g., to indicate not cloned). The instructing me include generating and outputting an unlink request to the storage nodes. The instructing the unlinking includes instructing a first storage node of the storage nodes updating a first slice location table to unlink a first slice name of the first one or more sets of at least a decode threshold of slice names from a first slice name of the second one or more sets of at least a decode threshold of slice names for a first encoded data slice of the one or more sets of encoded data slices. The instructing the unlinking further includes instructing a second storage node of the storage nodes updating a second slice location table to unlink a second slice name of the first one or more sets of at least a decode threshold of new slice names from a second slice name of the second one or more sets of at least a decode threshold of slice names for a second encoded data slice of the one or more sets of encoded data slices.

FIG. 6G is a diagram of another slice location table 140 that includes a slice name field 142, a cloned indicator field 144, and a location field 146. The slice location table of FIG. 6C is updated to produce the slice location table of FIG. 6G. The update may result from decloning an encoded data slice when two slice names point to a common encoded data slice. In addition, the update may result from decloning another encoded data slice when three or more slice names point to a second common encoded data slice.

As an example when the slice location table 140 is updated as a result of decloning an encoded data slice when two slice names point to the common encoded data slice, slice names DC60 and DC61 pointed to a common encoded data slice stored at location D341 as depicted in FIG. 6A. Slice location table entries associated with slice names DC60 and DC61 indicated that the slices were cloned. Next, the encoded data slice associated with slice name DC60 is updated and stored at a new slice storage location address of D342. The slice location table entry associated with slice name DC60 is updated to indicate not cloned and pointing to storage location D342. The slice location entry associated with slice name DC61 is updated to indicate not cloned and is still pointing to storage location D341 (e.g., thus maintaining an original snapshot).

As an example when the slice location table 140 is updated as a result of decloning an encoded data slice when three or more slice names point to another common encoded data slice, slice names DC70, DC78, and DC89 pointed to another common encoded data slice stored at location 3B5 as depicted in FIG. 6C. Slice location table entries associated with slice names DC70, DC78, and DC89 indicated that the slices were cloned. Next, the encoded data slice associated with slice name DC78 is updated and stored at a new slice storage location address of 3B6. The slice location table entry associated with slice name DC78 is updated to indicate not cloned and pointing to storage location 3B6. The two are more slice location entries associated with slice names DC70 and DC89 are not updated and still indicate cloned pointing to storage location 3B5 (e.g., thus maintaining two or more snapshots).

FIG. 6H is a flowchart illustrating an example of updating a slice. The method begins at step 190 where a processing module (e.g., of a dispersed storage (DS) unit) receives an update slice request. The request includes one or more of a slice name, a source name, and a new encoded data slice. The method continues at step 192 where the processing module determines whether the slice name of the request is associated with a cloned slice. The determination may be based on accessing an entry of a slice location table corresponding to the slice name and extracting a cloned entry of a cloned field. The processing module determines that the slice name of the request is associated with the cloned slice when the cloned entry indicates that an associated encoded data slice is cloned. The method branches to step 196 when the processing module determines that the slice name of the request is associated with the cloned slice. The method continues to step 194 when the processing module determines that the slice name of the request is not associated with the cloned slice. The method continues at step 194 where the processing module updates the encoded data slice. The updating includes one or more of storing the new encoded slice to a new memory storage location and storing the new encoded data slice to an existing memory storage location associated with the encoded data slice (e.g., to overwrite the encoded data slice with the new encoded data slice). The processing module updates the storage location table to indicate the new memory storage location is associated with the slice name when the new memory storage location is utilized.

The method continues at step 196 where the processing module stores the new encoded data slice of the request at the new memory storage location when the processing module determines that the slice name of the request is associated with the cloned slice. For example, the processing module stores the new encoded data slice at the new memory storage location and updates the storage location table to indicate the new memory storage location is associated with the slice name. The method continues at step 198 where the processing module determines cloned indicator modifications. For example, the processing module determines that the cloned indicator modifications includes an indication that the slice name associated with the new encoded data slice is not cloned. As another example, the processing module determines that the cloned indicator modifications includes an indication that a slice name associated with the cloned slice is not cloned when no other slice names are associated with the cloned slice. The method continues at step 200 where the processing module modifies the slice location table in accordance with the cloned indicator modifications.

Figure 7B:
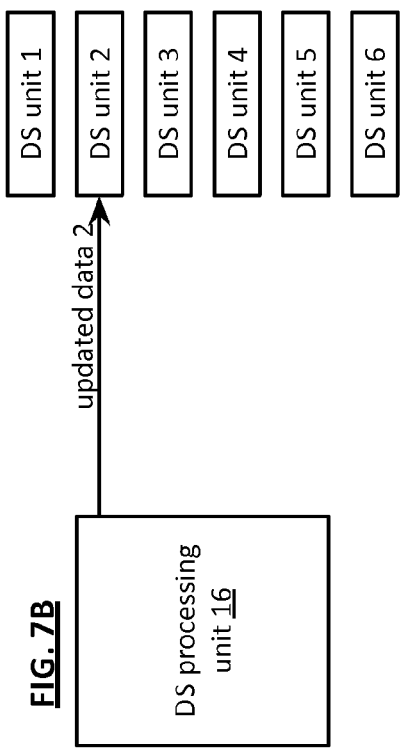
FIG. 7B is a schematic block diagram of another embodiment of a computing system of a second step of a data update scenario in accordance with the present invention.
Figure 7D:
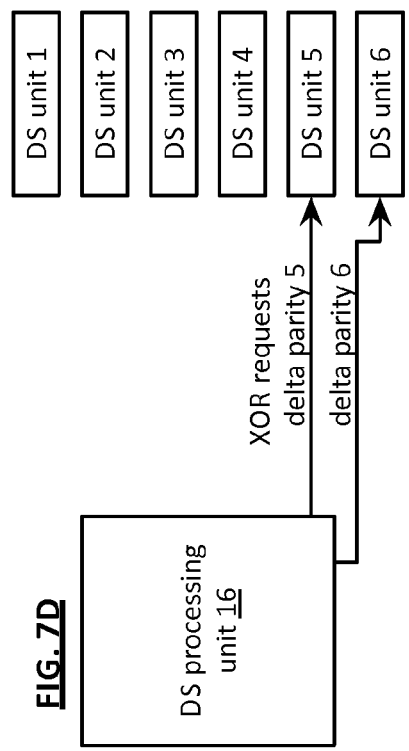
FIG. 7D is a schematic block diagram of another embodiment of a computing system of a fourth step of a data update scenario in accordance with the present invention.
Figure 7A:
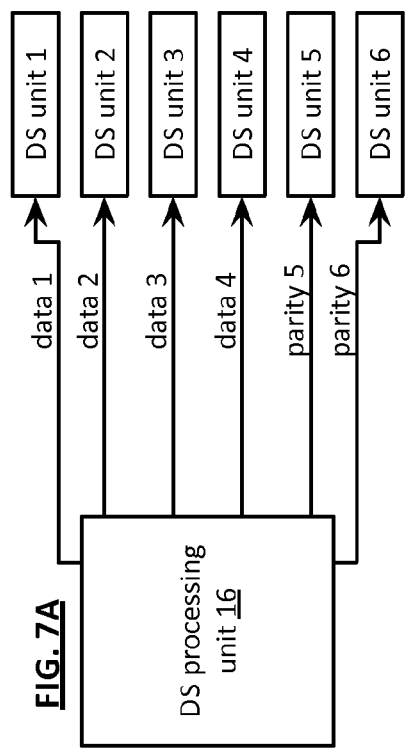
FIG. 7A is a schematic block diagram of another embodiment of a computing system of a first step of a data update scenario in accordance with the present invention.

FIG. 7A is a schematic block diagram of another embodiment of a computing system that includes a dispersed storage (DS) processing unit 16 and a set of DS units 1-6. A first step of a data update scenario includes the DS processing unit 16 generating and storing data as data 1-4 and generates and stores parity of the data as parity 5-6 in DS units 1-6. The generating of data 1-4 and parity 5-6 is in accordance with a data encoding function. The data encoding function includes utilizing an encoding matrix. The encoding matrix may be associated with a systematic erasure code and may include a unity square matrix (e.g., a first decode threshold number of rows each includes a one in a single column of a decode threshold number of columns producing a diagonal string of one's) and includes a width number minus the decode threshold number of parity rows (e.g., a Vandermonde matrix). The parity rows includes encoding matrix entries in accordance with the data encoding function.

The generation of data 1-4 and parity 5-6 includes matrix multiplying the encoding matrix by the data to produce a width number of encoded data slices. The encoded data slices 1-4 produce data 1-4 and encoded data slices 5-6 produce parity 5-6. The storing of the data includes sending data 1 to DS unit 1 for storage therein, sending data 2 to DS unit 2 for storage therein, sending data 3 to DS unit 3 for storage therein, sending data 4 to DS unit 4 for storage therein, sending parity 5 to DS unit 5 for storage therein, and sending parity 6 to DS unit 6 for storage therein.

FIG. 7B is a schematic block diagram of another embodiment of a computing system that includes a dispersed storage (DS) processing unit 16 and a set of DS units 1-6. A second step of a data update scenario includes the DS processing unit 16 obtaining an updated portion of data to produce updated data and sending an updated data storage request message to a corresponding DS unit to replace a corresponding portion of the data. The obtaining may include receiving the updated portion of data, receiving data that includes the updated portion of data, and analyzing data to detect the updated portion of data. The storage request message may include one or more of the updated data, encoding information, and a request for delta parity information. The encoding information may include one or more of an encoding matrix, a width, and a decode threshold. For example, the DS processing unit 16 receives an updated portion of data corresponding to a second portion of data to produce updated data 2 (e.g., slice 2) and sends a storage request message to DS unit 2 that includes the updated data 2.

Figure 7C:
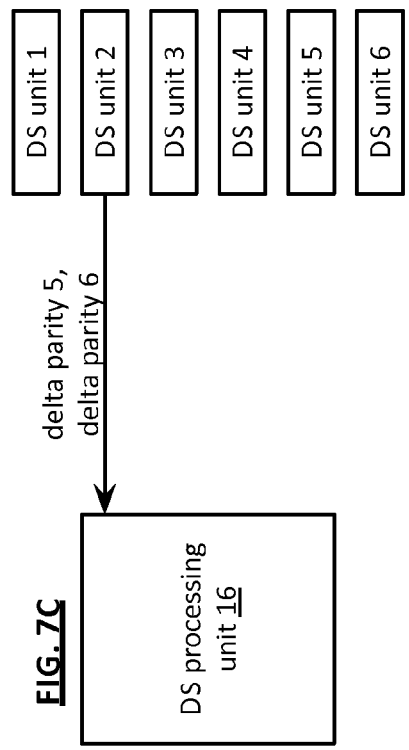
FIG. 7C is a schematic block diagram of another embodiment of a computing system of a third step of a data update scenario in accordance with the present invention.

FIG. 7C is a schematic block diagram of another embodiment of a computing system that includes a dispersed storage (DS) processing unit 16 and a set of DS units 1-6. A third step of a data update scenario includes the DS processing unit 16 generating delta parity information based on updated data, data (e.g., previous data which is being replaced by the updated data) and an encoding function, and sending the delta parity information to a corresponding DS processing unit 16. Alternatively, the DS unit sends the delta parity information directly to one or more other DS units associated with storage of parity information. For example, DS unit 2 generates the delta parity information to include delta parity 5 and delta parity 6 based on updated data 2, data 2, and the encoding function and sends the delta parity information to the DS processing unit 16. For instance, DS unit 2 generates the delta parity information in accordance with formulas delta parity 5=rebuilt partial (for parity 5 based on updated data 2) XOR rebuilt partial (for parity 5 based on data 2) and delta parity 6=rebuilt partial (for parity 6 based on updated data 2) XOR rebuilt partial (for parity 6 based on data 2) and sends the delta parity information to a corresponding DS processing unit 16. The DS unit 2 generates such a rebuilt partial (for parity 5 based on updated data 2) by multiplying an inverted square matrix of a unity matrix of an encoding matrix of the encoding function by a data matrix including the updated data 2 by a row of the encoding matrix corresponding to parity 5.

FIG. 7D is a schematic block diagram of another embodiment of a computing system that includes a dispersed storage (DS) processing unit 16 and a set of DS units 1-6. A fourth step of a data update scenario includes the DS processing unit 16 outputting one or more exclusive OR (XOR) requests to one or more DS units associated with storing parity information. The XOR requests includes delta parity information and a parity slice identifier, each of the one or more DS units generates and stores updated parity information based on the delta parity information, stored parity information, and encoding information. For example, the DS processing unit 16 sends an XOR request that includes delta parity 5 to DS unit 5 and sends an XOR request that includes delta parity 6 to DS unit 6. DS unit 5 retrieves parity 5 (e.g., from a local DS unit 5 memory), wherein parity 5 is associated with updated parity 5. DS unit 5 generates updated parity 5 in accordance with a formula updated parity 5=parity 5 XOR delta parity 5. DS unit 5 stores updated parity 5 (e.g., in the local memory), replacing parity 5. DS unit 6 retrieves parity 6 (e.g., from a local DS unit 6 memory). The parity 6 is associated with updated parity 6. DS unit 6 generates updated parity 6 in accordance with a formula updated parity 6=parity 6 XOR delta parity 6. DS unit 6 stores updated parity 6 (e.g., in the local DS unit 6 memory), replacing parity 6.

FIG. 7E is a flowchart illustrating an example of updating data storage. The method begins at step 202 where a processing module (e.g., of a dispersed storage (DS) processing unit) sends an update data slice request to a corresponding data DS unit. An updated data slice of the request is associated with a previously stored encoded data slice of a set of stored encoded data slices. The method continues at step 204 where the processing module receives delta parity information (e.g., from the corresponding data DS unit). The method continues at step 206 where the processing module sends the delta parity information to one or more parity DS units. The one or more parity DS units are associated with the storage of parity information associated with the set of stored encoded data slices.

FIG. 7F is a flowchart illustrating an example of storing updated data. The method begins at step 208 where a processing module (e.g., of a dispersed storage (DS) unit) receives an update data slice (e.g., updated data) request corresponding to a previously stored encoded data slice (e.g., data). The method continues at step 210 where the processing module retrieves the previously stored encoded data slice from a memory (e.g., associated with the data DS unit). The method continues at step 212 where the processing module generates delta parity information based on an updated encoded data slice of the request and the previously stored encoded data slice. For example, the processing module generates the delta parity information in accordance with formulas delta parity 5=rebuilt partial (for parity slice 5 based on updated data slice 2) exclusive OR (XOR) rebuilt partial (for parity slice 5 based on data slice 2) and delta parity 6=rebuilt partial (for parity slice 6 based on updated data slice 2) XOR rebuilt partial (for parity slice 6 based on data slice 2) when the delta parity information includes two parity slices.

The method continues at step 214 where the processing module stores the updated encoded data slice. Alternatively, or in addition to, the processing module replaces the encoded data slice with the updated data slice and/or deletes the data slice. The method continues at step 216 where the processing module outputs the delta parity information (e.g., to a corresponding DS processing unit associated with sending the updated data slice).

FIG. 7G is a flowchart illustrating an example of generating an updated parity slice. The method begins at step 218 where a processing module (e.g., of a parity dispersed storage (DS) unit) receives an exclusive OR (XOR) request that includes delta parity information and a parity slice name corresponding to a stored parity slice. The method continues at step 220 where the processing module retrieves the stored parity slice (e.g., from a local memory of the parity DS unit). The method continues at step 222 where the processing module generates an updated parity slice based on the delta parity information and the stored parity slice. For example, the processing module generates the updated parity slice in accordance with a formula updated parity slice 5=parity slice 5 XOR delta parity slice 5 when the DS unit is DS unit 5. The method continues at step 224 where the processing module stores the updated parity slice. Alternatively, or in addition to, the processing module replaces the parity slice with the updated data slice and/or deletes the parity slice.

Figures 8A, 8B:
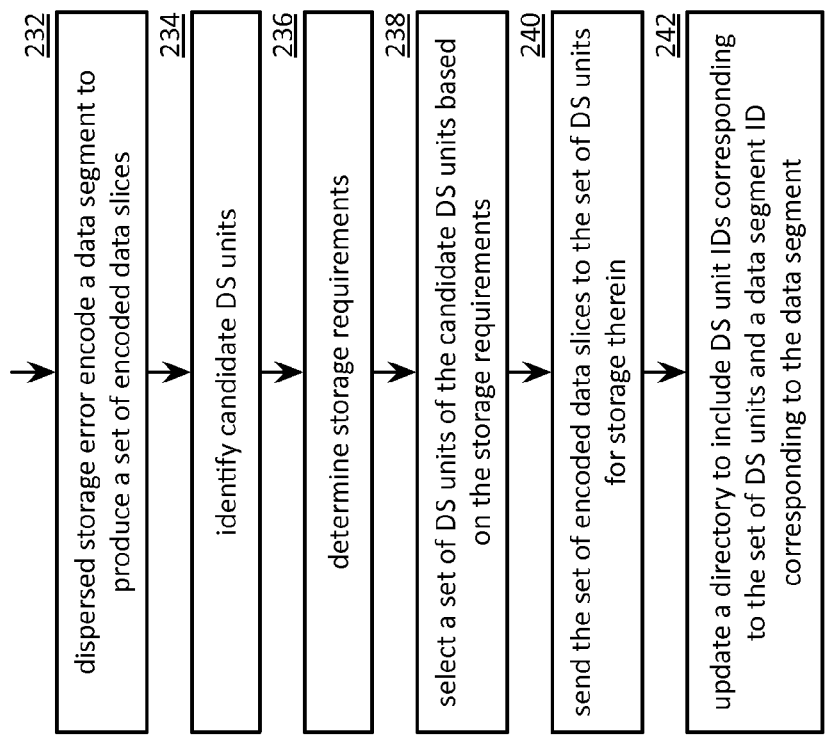
FIG. 8A is a diagram illustrating an example of a directory in accordance with the present invention.
FIG. 8B is a flowchart illustrating an example of storing data in accordance with the present invention.

FIG. 8A is a diagram illustrating an example of a directory structure 218 that includes a file name field 220, a metadata field 222, and a slice location field 224. The slice location field 224 includes a segment number field 226 and a location information field 228. The directory 218 includes a plurality of entries. Each entry of the plurality of entries is associated with a filename entry in the file name field 220. Each filename entry describes a user file system file name (e.g., a file name, and object name, a block number) of an associated file stored as a plurality of sets of encoded data slices in a dispersed storage network (DSN) memory. Each set of encoded data slices corresponds to a data segment of a plurality of data segments of data of the associated file.

The entry includes a metadata entry of the metadata field 222. Each metadata entry corresponds to a filename of the plurality of filenames. Each metadata entry may include one or more metadata values. The metadata values may include values associated with one or more of a data size indicator, a data type indicator, a creation date, an owner identifier (ID), permissions, a delete date, and storage requirements. For example, metadata associated with filename clip.mpg includes a data size indicator of 500 megabytes and a data type indicator of a video file. Alternatively, a plurality of metadata entries may correspond to a plurality of data segments of the data.

The entry includes one or more segment number entries in the segment number field 226. Each segment number entry corresponds to a filename and includes at least one of a segment number and a block number. For example, segment numbers 1-3 correspond to three data segments included in data of filename foo.doc and segment numbers 1-4 correspond to for data segments included in data of filename clip.mpg.

The entry includes one or more location entries in the location information field 228. Each location information entry includes location information associated with storage of a set of encoded data slices associated with a corresponding data segment. Each data segment may be stored in the DSN memory at a different location. The location information includes one or more of a set of dispersed storage (DS) unit identifiers (IDs), a set of internet protocol (IP) addresses corresponding to the set of DS units, a hostname, a site name, and a set of slice names corresponding to the set of encoded data slices. For example, a set of encoded data slices associated with data segment 2 of foo.doc is stored at DS units 17-32.

FIG. 8B is a flowchart illustrating an example of storing data. The method begins at step 232 where processing module (e.g., of a dispersed storage (DS) processing module) dispersed storage error encodes a data segment to produce a set of encoded data slices. The method continues at step 234 where the processing module identifies candidate DS units. The identifying may be based on one or more of a previously utilized DS unit identifier (ID), a DS unit list, and DS unit availability information. For example, the processing module identifies the candidate DS units to include DS units that are currently online and operational (e.g., available).

The method continues at step 236 where the processing module determines storage requirements. The determining may be based on one or more of metadata associated with the data segment which includes at least one of a storage requirement, a query to a requesting entity, a vault identifier (ID), a requirements lookup based on the vault ID, and receiving the storage requirements.

The method continues at step 238 where the processing module selects a set of DS units of the candidate DS units based on the storage requirements. The selecting may be based on one or more of a preferred DS unit list, received DS unit IDs, a user ID, a vault ID, a security level, a performance level, a data type, metadata, an estimated DS unit performance level, historical DS unit performance information, a DS unit availability indicator, and a DS unit capacity level. For example, the processing module selects the set of DS units that are associated with estimated DS unit performance levels that each compare favorably to a DS unit performance level threshold.

The method continues at step 240 where the processing module sends the set of encoded data slices to the set of DS units for storage therein. The method continues at step 242 where the processing module updates a directory. The updating includes modifying the directory to include one or more of DS unit IDs corresponding to the set of DS units, a data segment ID corresponding to the data segment, and a set of internet protocol (IP) addresses associated with the set of DS units. In an example of a retrieval method of operation, the processing module utilizes the filename to index into the directory to extract slice locations for each data segment, sends read requests to the slice locations, receives slices, and decodes the slices to reproduce the data.

Figure 9A:
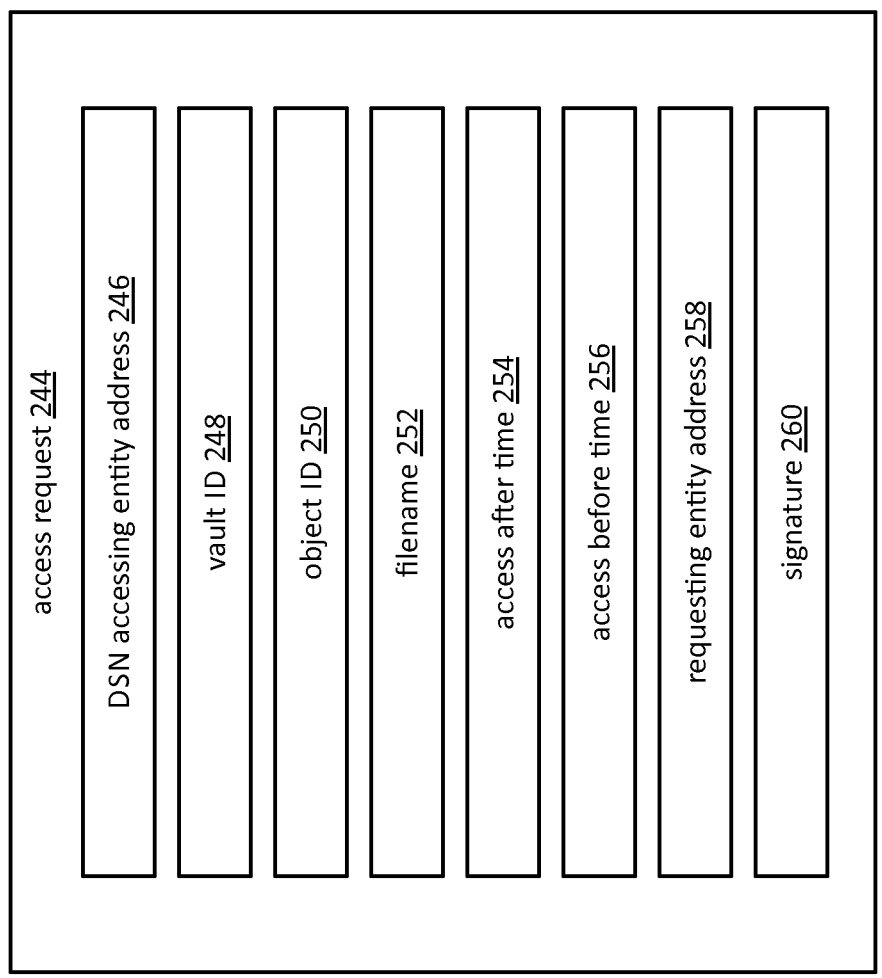
FIG. 9A is a diagram illustrating an example of an access request in accordance with the present invention.

FIG. 9A is a diagram illustrating an example of a access request structure 244 that includes one or more of a dispersed storage network (DSN) accessing entity address field 246, a vault identifier (ID) field 248, an object ID field 250, a filename field 252, an access after time field 254, an access before time field 256, a requesting entity address field 258, and a signature field 260. The access request structure 244 may be utilized to generate an access request to request access of a DSN. The access request may be generated in accordance with a uniform resource locator (URL) format. For example, the access request may be generated in the URL format as: https://east-coast.accesser-pool.acme.com/videovault/31930183023892/video.avi?starttime=12052011&endtime=12172011&ipPattern=156.53.12.x&signature=BF4523A0C1289A179812D1.

The DSN accessing entity address field 246 includes a target (e.g., DS processing unit) address entry. For example, the entry may include a hostname pointing to a collection of internet protocol (IP) addresses associated with a pool of DS processing units to be utilized for access of the DSN. For instance, an address entry https://east-coast.accesser-pool.acme.com points to an East Coast DS processing unit pool.

The vault ID field 248 includes a vault ID entry including a name of an associated vault. For instance, a vault ID entry of/video-vault/specifies a video file vault. The object ID field 250 includes an object ID entry utilized by the DSN in a source name and a plurality of sets of slice names of a corresponding plurality of sets of encoded data slices associated with a filename of data of the request. For instance, an object ID entry of/31930183023892/specifies the object ID utilized by the DSN. The filename field 252 includes a filename entry associated with the data of the request. The filename may be returned to a requesting entity when retrieving the data associated with the filename. For instance, a filename entry of video.avi references data associated with filename video.avi.

The access after time field 254 includes an access after time entry utilized to control access. For example, access is allowed when a current time indicator indicates that current time is after the after time entry. For instance, an access after time entry of starttime=12052011 indicates that access is allowed when the current time is after Dec. 5, 2011. The access before time field 256 includes an access before time entry utilized to control access. For example, access is allowed when the current time indicator indicates that current time is before the before time entry. For instance, an access before time entry of endtime=12172011 indicates that access is allowed when the current time is before Dec. 17, 2011.

The requesting entity address field 258 includes a requesting entity address entry. The requesting entity address entry includes one or more of a universally unique ID (UUID), a DSN ID, a user device ID, a DS processing unit ID, a DS unit ID, and an IP address pattern. For instance, a requesting entity address entry of ipPattern=156.53.12.x indicates an IP address pattern that includes a wildcard at position x. As such, access is allowed when an IP address of a requesting entity includes an IP address of 156.53.12.1-156.53.12.9. The signature field 260 includes a signature entry, wherein the signature entry includes at least one of a hash-based message authentication code (HMAC) and digital signature generated over other parameters of the access request (e.g., the target DS processing unit address through the requester address). For instance, a signature entry of signature=BF4523A0C1289A179812D1 includes hexadecimal encoding of a digital certificate which corresponds to a request verification entity (e.g., signed by) which is authorized to enable access to the DSN. Alternatively, or in addition to, additional access information may be embedded into the URL of the access request. The additional access information includes one or more of an access type (e.g., write, read, delete, list, etc.), permissions, preferred access characteristics, a security indicator, a priority indicator, a performance level indicator, and reliability level indicator, and an availability level indicator.

Figure 9B:
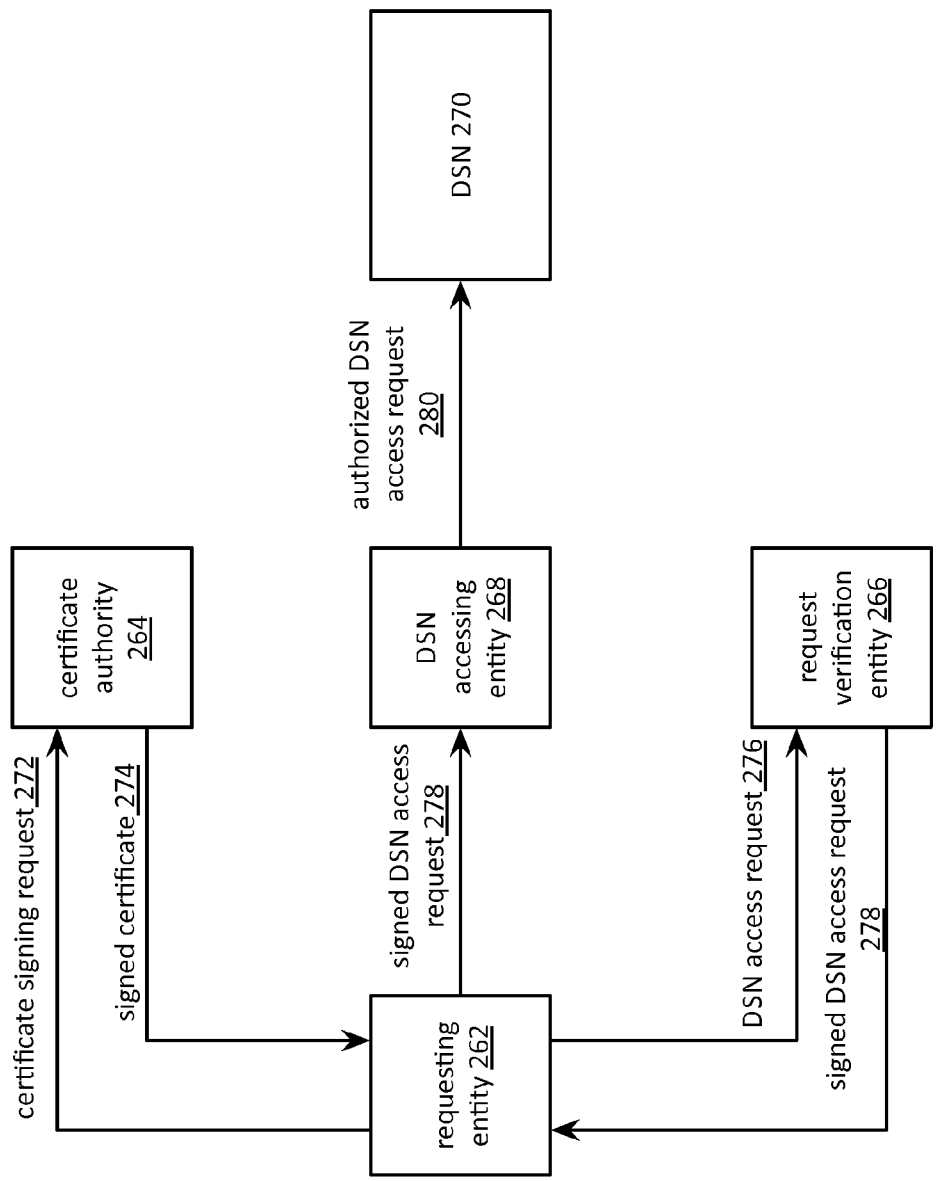
FIG. 9B is a schematic block diagram of an embodiment of a security system for a distributed storage network (DSN) in accordance with the present invention.

FIG. 9B is a schematic block diagram of an embodiment of a security system for a distributed storage network (DSN) 270 that includes a requesting entity 262, a certificate authority 264, a request verification entity 266, and a DSN accessing entity 268. One or more of the requesting entity 262, the certificate authority 264, the request verification entity 266, and the DSN accessing entity 268 may be implemented as part of the DSN 270. The requesting entity 262 may be implemented as at least one of a user device, a dispersed storage (DS) processing unit, and a DS unit. The certificate authority 264 may be implemented as a module of at least one of a security server, an authorization server and a DS managing unit. The DSN accessing entity 268 may be implemented as a module of at least one of a DS processing unit, a user device, and a DS unit. The request verification entity 266 may be implemented as a module of at least one of a security server, an authorization server, a DS processing unit, and a DS managing unit. For example, the requesting entity 262 is implemented as a user device, the certificate authority 264 is implemented as a module of a DS managing unit of the DSN 270, the DS and accessing entity 268 is implemented as a DS processing unit 16 of the DSN 270, and the request for location entity 266 is implemented as a module of the DS processing unit 16 of the DSN 270.

The requesting entity 262 sends a certificate signing request (CSR) 272 to the certificate authority 264. The certificate signing request includes one or more of a requesting entity identifier (ID), a public key of a public-private key pair associated with the requesting entity 262, a password, a shared secret, a signature generated by the requesting entity 262, and authorization information. The certificate authority 264 authorizes the CSR 272. The authorizing includes one or more of verifying the signature by the requesting entity 262 utilizing the public key associated with the requesting entity 262, verifying the password, verifying the shared secret, and verifying the authorization information. When authorized, the certificate authority 264 generates a signature over the CSR 272 to produce a signed certificate 274 utilizing a private key of a public-private key pair of the certificate authority 264. The certificate authority 264 sends the signed certificate 274 to the requesting entity 262.

The requesting entity 262 sends a DSN access request 276 to the request verification entity 266. The DSN access request 276 includes the signed certificate 274, which indicates that the requesting entity 262 is an authorized affiliate of the DSN 270, and DSN accessing information regarding how the requesting entity 262 would like to access the DSN 270. The DSN accessing information includes addressing information of the requesting entity (e.g., an internet protocol (IP) address of the requesting entity 262, a requesting entity ID), addressing information of the DSN accessing entity 268 (e.g., an IP address of the DSN accessing entity 268, a DS processing unit ID, a DS unit ID, a DS unit IP address), data addressing information (e.g., a vault ID, an object ID, a filename, a slice name), and data access timing information (e.g., an access after time, an access before time).

The request verification entity 266 verifies the signed certificate 274 by verifying identity of the certificate authority 264 that generated the signed certificate 274 (e.g., check a list, verify a signature). The request verification entity 266 verifies the DSN accessing information by verifying one or more of addressing information of the requesting entity, addressing information of the DSN accessing entity, data addressing information, and data access timing information. For example, the request verification entity 266 indicates verified when an IP address of the addressing information of the requesting entity substantially matches an IP address associated with receiving the DSN access request 276. As another example, the request verification entity 266 indicates verified when an IP address of the addressing information of the DSN accessing entity substantially matches an IP address of a list of allowable IP addresses. As yet another example, the request verification entity 266 indicates verified when data access timing information of the DSN access request 276 substantially matches an allowable timeframe of a list of allowable timeframes.

The request verification entity 266 signs the DSN access request 276 by generating a signature based on a private key of a public/private key pairing of the request verification entity 266 to produce a signed DSN access request 278. The signed DSN access request 278 includes the signature of the request verification entity 266, the signed certificate 274, and the DSN accessing information. The request verification entity 266 sends the signed DSN access request 278 to the requesting entity 262 when the request verification entity 266 signs the DSN access request 276 after verifying the signed certificate 274 and the DSN accessing information.

The requesting entity 262 sends the signed DSN access request 278 to the DSN accessing entity 268. The DSN accessing entity 268 sends an authorized DSN access request 280 to the DSN 270 via a network connection when the DSN accessing entity 268 verifies the signature of the request verification entity. The DSN accessing entity 268 verifies the signature of the request verification entity 266 based on a public key of the public/private key pairing of the request verification entity. The DSN accessing entity 268 may further verify at least one of the signed certificate 274 and the DSN accessing information. The authorized DSN access request 280 includes, at a minimum, at least a portion of the DSN accessing information. The DSN 270 may further authorize the DSN access request 280 by verifying the at least the portion of the DSN accessing information.

Figure 9C:
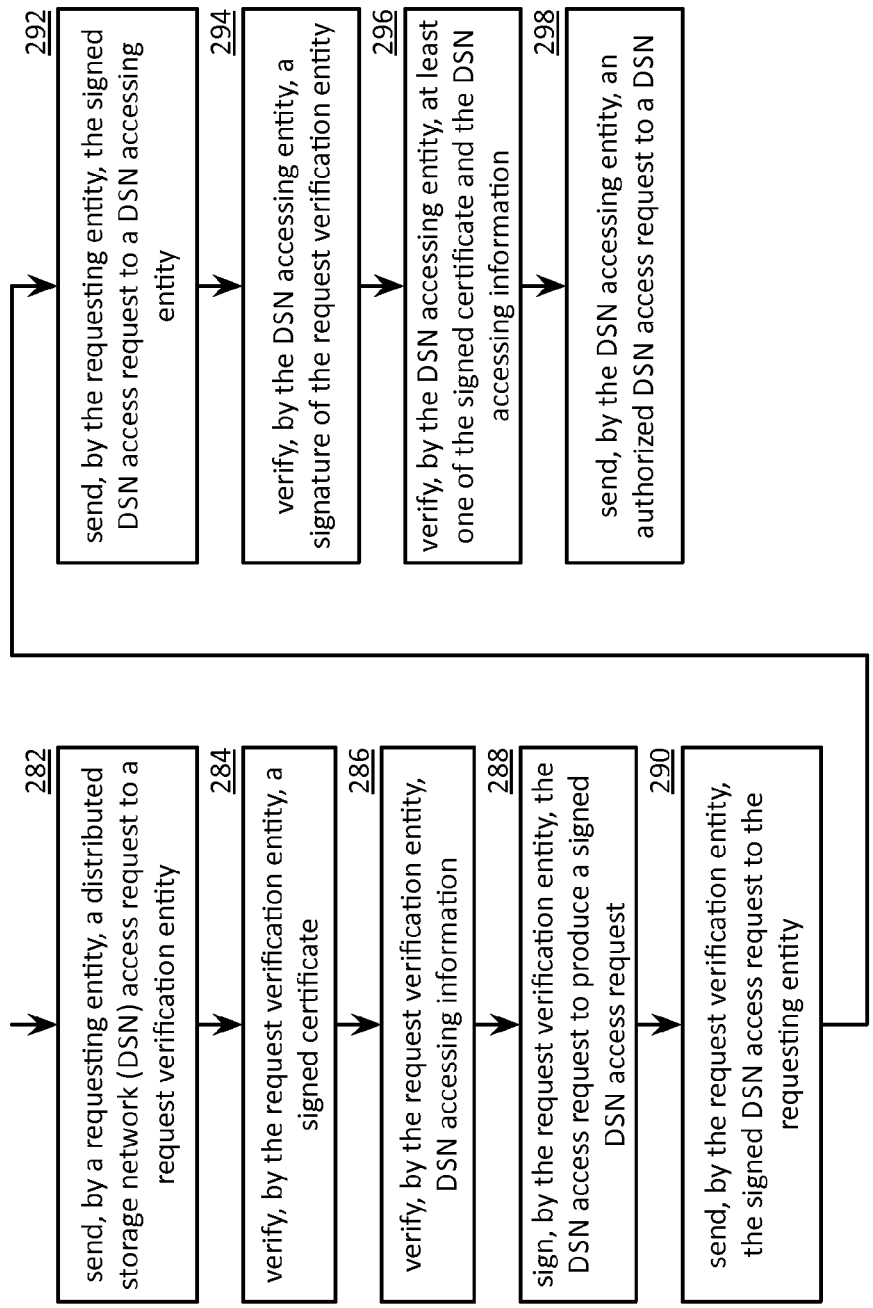
FIG. 9C is a flowchart illustrating an example of accessing a dispersed storage network (DSN) in accordance with the present invention.

FIG. 9C is a flowchart illustrating an example of accessing a dispersed storage network (DSN). The method begins at step 282 where a requesting entity (e.g., a user device) sends a DSN access request to a request verification entity (e.g., a dispersed storage (DS) processing unit). The DSN access request includes a signed certificate (e.g., signed by a certificate authority of the DSN), which indicates that the requesting entity is an authorized affiliate of the DSN, and DSN accessing information regarding how the requesting entity would like to access the DSN. The method continues at step 284 where the request verification entity verifies the signed certificate by verifying identity of the certificate authority that generated the signed certificate (e.g., check a list, verify a signature).

The method continues at step 286 where the request revocation entity verifies the DSN accessing information by verifying one or more of addressing information of the requesting entity, addressing information of the DSN accessing entity, data addressing information, and data access timing information. The method continues at step 288 where the request revocation entity signs the DSN access request by generating the signature based on a private key of a public/private key pairing of the request verification entity. The method continues at step 290 where the request revocation entity sends a signed DSN access request to the requesting entity when the request verification entity signs the DSN access request after verifying the signed certificate and the DSN accessing information. The signed DSN access request includes a signature of the request verification entity, the signed certificate, and the DSN accessing information.

The method continues at step 292 where the requesting entity sends the signed DSN access request to a DSN accessing entity (e.g., another DS processing unit). The method continues at step 294 where the DSN accessing entity verifies the signature of the request verification entity based on a public key of a public/private key pairing of the request verification entity. The method continues at step 296 where the DSN accessing entity verifies at least one of the signed certificate and the DSN accessing information.

The method continues at step 298 where the DSN accessing entity sends an authorized DSN access request to the DSN via a network connection when the DSN accessing entity verifies the signature of the request verification entity. The authorized DSN access request includes, at a minimum, the DSN accessing information. For example, the authorized DSN access request may further include the signed certificate and/or the signature of the request verification entity). In addition, the DSN may send a DSN access response (e.g., including data, including a slice) in response to the DSN access request.

FIG. 10A is a flowchart illustrating an example of establishing access to a legacy service (e.g., a first-time access). The method begins at step 300 where a processing module (e.g., of a user device) obtains a new username and a new password associated with a service. The new username and the new password may be subsequently utilized to access the service (e.g., a web-based service, a server-based service). The obtaining includes at least one of receiving a user input, generating a random password, generating a pseudorandom password, retrieving an existing username as the new username, generating a random username, and generating the new username based on an existing username. For example, the processing module obtains the new username by receiving the user input and obtains the new password by generating the random password.

The method continues at step 302 where the processing module facilitates retrieval of a private key from a dispersed credential storage system. For example, the processing module receives a user input password, generates a set of blinded passwords based on the password and a set of random numbers, sends the set of blinded passwords to a set of authentication servers, receives a set of passkeys from the set of authentication servers, reproduces a set of keys based on the set of passkeys and the set of random numbers, decrypts a set of encrypted shares (e.g., retrieved from the set of authentication servers) utilizing the set of keys to reproduce a set of shares, and decodes the set of shares to reproduce the private key.

The method continues at step 304 where the processing module facilitates retrieval of an encrypted credential package from the dispersed credential storage system. For example, the processing module generates a second set of blinded passwords based on the password and/or a second user input password and a second set of random numbers, sends the second set of blinded passwords to the set of authentication servers, receives a second set of passkeys from the set of authentication servers, reproduces a second set of keys based on the second set of passkeys and the second set of random numbers, decrypts a second set of encrypted shares (e.g., retrieved from the set of authentication servers) utilizing the second set of keys to reproduce a second set of shares, and decodes the second set of shares to reproduce the encrypted credential package. Alternatively, the processing module extracts the encrypted credential package from decoding the set of shares that reproduced the private key.

The method continues at step 306 where the processing module decrypts the encrypted credential package utilizing the private key to reproduce a credential package. The credential package includes one or more of a list of usernames, a list of associated passwords, wherein each username is associated with a password, and associated service access information. The associated service access information includes one or more of a service name, a service identifier (ID), a site address (e.g., a dispersed storage (DS) unit identifier (ID), a DS unit internet protocol (IP) address), and a signed certificate. For example, a site address of www.my-email.com is associated with password jq21k2lejd!23, a second site address of www.my-bank.com is associated with password Z8421Ssa%$#@$rd, and a third site address of www.my-shopping-site.com is associated with password GHSDasdfa3332. A system improvement may be provided when a user is not required to remember or write down passwords for each service of interest.

The method continues at step 308 where the processing module updates the credential package to produce an updated credential package. The updating includes adding one or more of the new username, the new password, and service access information associated with the service to the credential package to produce the updated credential package.

The method continues at step 310 where the processing module encrypts the updated credential package to produce an updated encrypted credential package. The encrypting includes encrypting the updated credential package utilizing the private key to produce the updated encrypted credential package and encrypting the updated credential package utilizing a public key associated with the private key to produce the updated encrypted credential package.

The method continues at step 312 where the processing module facilitates storing the updated encrypted credential package in the dispersed credential storage system. For example, the processing module receives the user input password, generates a new set of keys based on the password and a new set of random numbers, encodes the updated encrypted credential package to produce an updated set of shares, encrypts the updated set of shares utilizing the new set of keys to produce a new set of encrypted shares, and facilitates storing the new set of encrypted shares and the new set of random numbers (e.g., sending to a set of authentication servers for storage therein).

FIG. 10B is a flowchart illustrating an example of accessing a legacy service that includes similar steps to FIG. 10A. The method begins with steps 302-306 of FIG. 10A where a processing module (e.g., of a user device) facilitates retrieval of a private key from a dispersed credential storage system, facilitates retrieval of an encrypted credential package from the dispersed credential storage system, and decrypts the encrypted credential package utilizing the private key to reproduce a credential package.

The method continues at step 320 where the processing module extracts a username, a password, and service access information from the credential package. The method continues at step 322 where the processing module facilitates service access utilizing the username, the password, and the service access information. For example, the processing module sends the username and password to a site address of the service access to information.

Figure 11A:
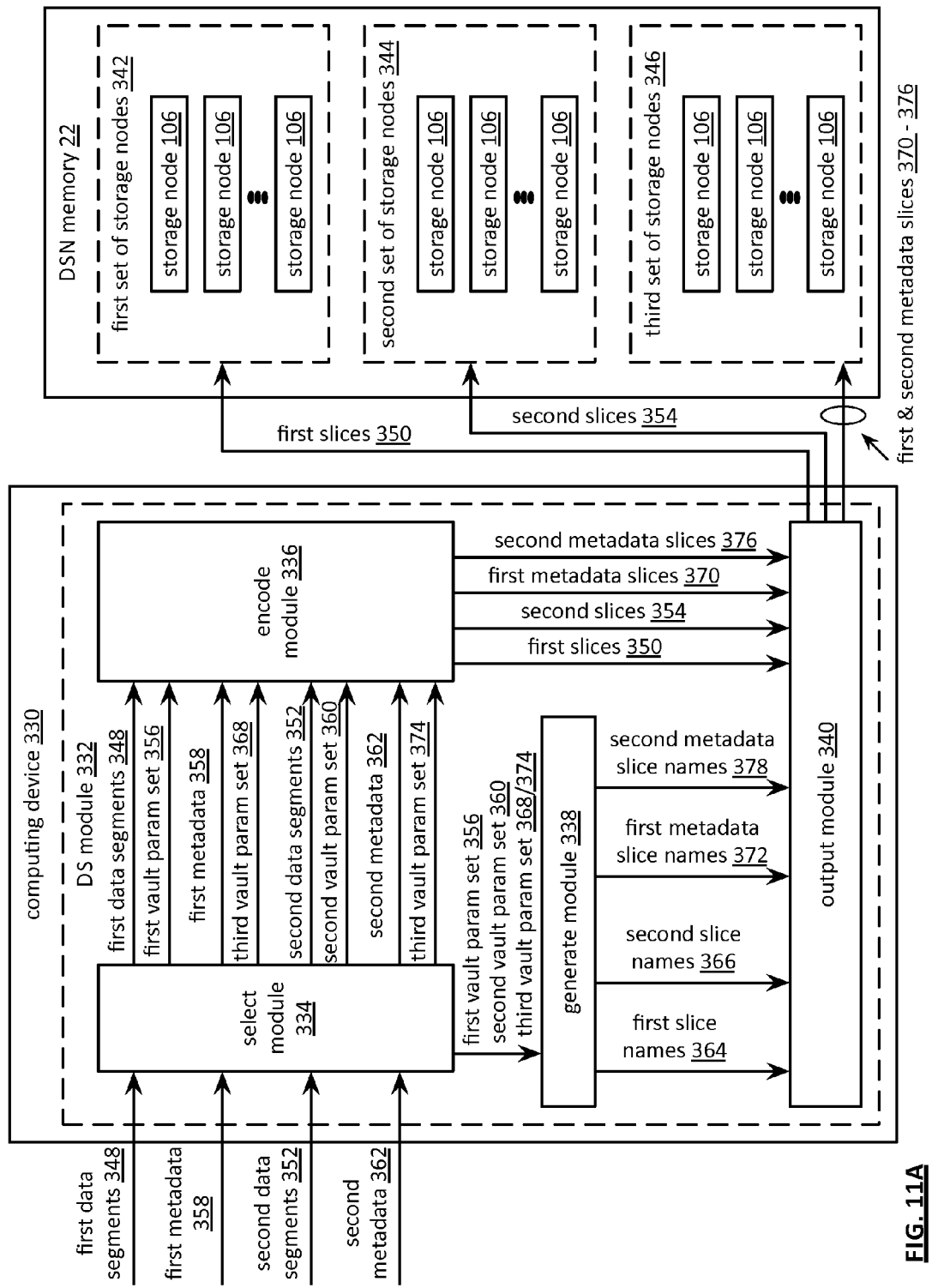
FIG. 11A is a schematic block diagram of another embodiment of a computing system in accordance with the present invention.

FIG. 11A is a schematic block diagram of another embodiment of a computing system that includes a computing device 330 and a dispersed storage network memory 22. The DSN memory 22 includes a plurality of sets of storage nodes 342, 344, and 346. Each set of storage nodes of the plurality of sets of storage nodes 342-346 includes a plurality of storage nodes 106. Each storage node 106 of the plurality of storage nodes 106 may be implemented utilizing at least one of a dispersed storage (DS) unit, a storage server, a DS processing unit, and a user device. The computing device 330 includes a DS module 332. The DS module 332 includes a select module 334, an encode module 336, a generate module 338, and an output module 340.

The system is operable to encode and store a first group of data segments 348 of a first data object of a vault as a first plurality of sets of encoded data slices 350 in the first set of storage nodes 342 and to encode and store a second group of data segments 352 of a second data object of the vault as a second plurality of sets of encoded data slices 354 in the second set of storage nodes 344. The first group of data segments 348 consisting of one of a first file, a first data object, a first data block, a first data stream, and a first file directory object. The second group of data segments 352 consisting of one of a second file, a second data object, a second data block, a second data stream, and a second file directory object.

For the first group of data segments 348, the select module 334 selects a first vault parameter set 356 from a plurality of vault parameter sets. The first vault parameter set 356 includes a first set of parameters regarding dispersed error encoding data segments of the first group of data segments 348. The first set of parameters includes one or more of identity of a first dispersed storage error encoding algorithm (e.g., Reed Solomon, Cauchy Reed Solomon, rateless encoding, etc.), first error coding redundancy information (e.g., pillar width, decode threshold, write threshold, number of code blocks, etc.), and an identifier of a set of storage nodes.

The select module 334 selects the first vault parameter set 356 based on one or more of identifying a storage requirement for the first group of data segments 348 and interpreting metadata (e.g., first metadata 358) associated with the first group of data segments 348. The storage requirement includes one or more of a reliability requirement, a performance requirement, a security requirement, and a storage size requirement. The identifying includes at least one of receiving, retrieving, initiating a query, and generating based on at least one aspect of the metadata. The metadata includes one or more of any data type indicator, a data size indicator, a data priority indicator, and a data owner. The selecting may include matching the first vault parameter set associated with an estimated performance level that substantially meets the storage requirement and/or best aligns with the interpreting the metadata. For example, the select module 334 selects the first vault parameter set 356 that is associated with a high level of reliability when the metadata indicates that the first group of data segments 348 includes a financial records data type and requires a highest level of reliability. As another example, the select module 334 selects the first vault parameter set 356 that is associated with a high level of efficiency, and lower reliability, when the metadata indicates that the first group of data segments 348 includes a video file data type and does not require a high level of reliability.

For the second group of data segments 352, the select module 334 selects a second vault parameter set 360 from the plurality of vault parameter sets. The second vault parameter set 360 includes a second set of parameters regarding dispersed error encoding data segments of the second group of data segments 352. The second set of parameters includes identity of a second dispersed storage error encoding algorithm and second error coding redundancy information. The select module 334 selects the second vault parameter set 360 based on one or more of identifying a storage requirement for the second group of data segments 352 and interpreting metadata (e.g., second metadata 362) associated with the second group of data segments 352. The encode module 336 encodes the first group of data segments 348 in accordance with the first vault parameter set 356 to produce the first plurality of sets of encoded slices 350. The encode module 336 encodes the second group of data segments 352 in accordance with the second vault parameter set 360 to produce the second plurality of sets of encoded slices 354.

The generate module 338 generates a first plurality of sets of slice names 364 for the first plurality of sets of encoded slices 350 in accordance with the first vault parameter set 356. A slice name of the first plurality of sets of slice names to 64 includes a vault identifier, a first vault parameter set identifier (e.g., a vault region), and a common object name (e.g., an object number) for the first group of data segments 348. The slice name of the first plurality of sets of slice names 364 further includes a first slice index and a first segment number. The first slice index corresponds to a slice number within a set of the first plurality of sets of encoded slices and the first segment number corresponds to a data segment number of the first group of data segments 348.

The generate module 338 generates a second plurality of sets of slice names 366 for the second plurality of sets of encoded slices 354 in accordance with the second vault parameter set 360. A slice name of the second plurality of sets of slice names 366 includes the vault identifier (e.g., same as vault identifier for the first plurality of sets of slice names 364), a second vault parameter set identifier, and a common object name (e.g., another object number) for the second group of data segments 352. The slice name of the second plurality of sets of slice names 366 further including a second slice index and a second segment number. The second slice index corresponds to a slice number within a set of the second plurality of sets of encoded slices and the second segment number corresponds to a data segment number of the second group of data segments 352.

The system further functions to select a vault parameter set for metadata of data and to encode metadata to produce slices for storage in a set of storage nodes corresponding to the selected vault parameter set for the metadata. The select module 334 obtains first metadata 358 regarding the first group of data segments 348. For the first metadata 358, the select module 334 selects a third vault parameter set 368 from the plurality of vault parameter sets. The third vault parameter set 368 includes a third set of parameters regarding dispersed error encoding the first metadata 358. The encode module 336 encodes the first metadata 358 in accordance with the third vault parameter set 368 to produce a first set of metadata encoded slices 370. The generate module 338 generates a first set of metadata slice names 372 for the first set of metadata encoded slices 370 in accordance with the third vault parameter set 368. A metadata slice name of the first set of metadata slice names 372 includes the vault identifier, a third vault parameter set identifier, and the common object name for the first group of data segments 348.

The select module 334 obtains second metadata 362 regarding the second group of data segments 352. For the second metadata 362, the select module 334 selects another third vault parameter set 374 from the plurality of vault parameter sets. The another third vault parameter set 374 includes a third set of parameters regarding dispersed error encoding the second metadata 362. The another third vault parameter set 374 may be substantially the same as the third vault parameter set 368 when storage requirements are substantially the same for the first metadata 358 and the second metadata 362. The encode module 336 encodes the second metadata 362 in accordance with the another third vault parameter set 374 to produce a second set of metadata encoded slices 376. The generate module 338 generates a second set of metadata slice names 378 for the second set of metadata encoded slices 376 in accordance with the third vault parameter set 374. A metadata slice name of the second set of metadata slice names 378 includes the vault identifier, a third vault parameter set identifier, and the common object name for the second group of data segments 352.

The output module 340 identifies the first set of storage nodes 342 of the DSN memory 22 based on the first vault parameter set 356. For example, the output module 340 accesses a vault parameter table utilizing the first vault parameter set identifier to identify the first set of storage nodes 342. The output module 340 identifies the second set of storage nodes 344 of the based on the second vault parameter set 360. For example, the output module 340 accesses the vault parameter table utilizing the second vault parameter set identifier to identify the second set of storage nodes 344.

The output module 340 outputs the first plurality of sets of encoded slices 350 to the first set of storage nodes 342. For example, the output module 340 generates a first plurality of sets of write slice requests that includes the first plurality of sets of encoded slices 350 and the first plurality of sets of slice names 364. Next, the output module 340 outputs the first plurality of sets of write slice requests to the first set of storage nodes 342. The output module 340 outputs the second plurality of sets of encoded slices 354 to the second set of storage nodes 344. The output module 340 outputs the first set of metadata encoded slices 370, utilizing the first set of metadata slice names 372, and the second set of metadata encoded slices 376, utilizing the second set of metadata slice names 378, to the third set of storage nodes 346 when the select module 334 selects the third vault parameter set 368 for both the first metadata 358 and the second metadata 362.

FIG. 11B is a diagram illustrating an example of a slice name structure 380 and example slice names that each include a slice index field 382, a vault information field 384, an object number field 386, and a segment number field 388. The slice index field 382 includes a slice index entry corresponding to a pillar number of an associated encoded data slice. For example, four permutations exist per set of slices when a pillar width associated with a set of slices is four. The vault information field 384 includes a vault identifier (ID) field 390, a vault region field 392, and a vault generation field 394. The vault ID field 390 includes a vault ID entry associated with the encoded data slice. A system registry may include a user association for the vault ID. For example, a first group of users is associated with a first vault ID. The vault region field 392 includes a vault region entry corresponding to the encoded data slice and may be utilized to obtain vault region parameters associated with access of the encoded data slice. The vault region parameters includes one or more of an information dispersal algorithm (IDA) ID, a pillar width, a decode threshold, a write threshold, a read threshold, a dispersed storage (DS) unit pool ID (e.g., an identifier of a set of storage nodes), and storage addresses of the DS unit pool (e.g., internet protocol addresses of the set of storage nodes).

A vault ID may be associated with a plurality of vault regions. Encoded data slices associated with the vault ID are stored in a dispersed storage network (DSN) in accordance with vault region parameters associated with each vault region of the vault ID. An encoded data slice maybe associated with a data file or metadata of the data file. Different vault regions may be associated with slices of different data types including data of different types and metadata associated with the different data types.

The vault generation field 394 includes a vault generation ID and may be utilized to signify generations of encoded data slice that are associated a common vault ID. The object number field 386 includes an object number entry. Each data file stored in the DSN is associated with a unique object number. A directory record may be utilized to associate the unique object number with a data file identifier. The segment number field 388 includes a segment number entry. The segment number entry is associated with a corresponding data segment. For example, four slice names of first data segment of a data file stored in the DSN include a vault ID of A03, a vault generation of 1, an object number of F4D766, and are assigned to a second vault region, wherein the second vault region is associated with desired vault region parameters to store the data. As another example, four slice names of first data segment of metadata of the data file stored in the DSN include the vault ID of A03, the vault generation of 1, the object number of F4D766, and are assigned to a first vault region, wherein the first vault region is associated with desired vault region parameters to store the metadata (e.g., more reliability than that of storing the data).

FIG. 11C is a diagram illustrating an example of a vault parameter table 396 that includes a vault region field 388 and a vault region parameters field 400. The vault region field 398 includes any number of vault region entries. A vault region entry number corresponds to a vault region entry of a slice name. The vault region parameters field 400 includes a corresponding set of vault region parameter entries. Each set of vault region parameter entries corresponds to a desired approach to store data of various types and metadata in a dispersed storage network (DSN) memory.

For example, a first vault region includes an information dispersal algorithm (IDA) 3, a pillar width of 36, a decode threshold of 22, a write threshold of 34, and a DS unit pool 3 to provide more reliability for storing of metadata. As another example, a second vault region includes an information dispersal algorithm (IDA) 5, a pillar width of 4, a decode threshold of 3, a write threshold of 3, and a DS unit pool 4 to provide more efficiency of storing data of a first data type. As yet another example, a third vault region includes an information dispersal algorithm (IDA) 6, a pillar width of 16, a decode threshold of 10, a write threshold of 12, and a DS unit pool 8 to provide above-average storage liability of storing data of a second data type.

Figure 11D:
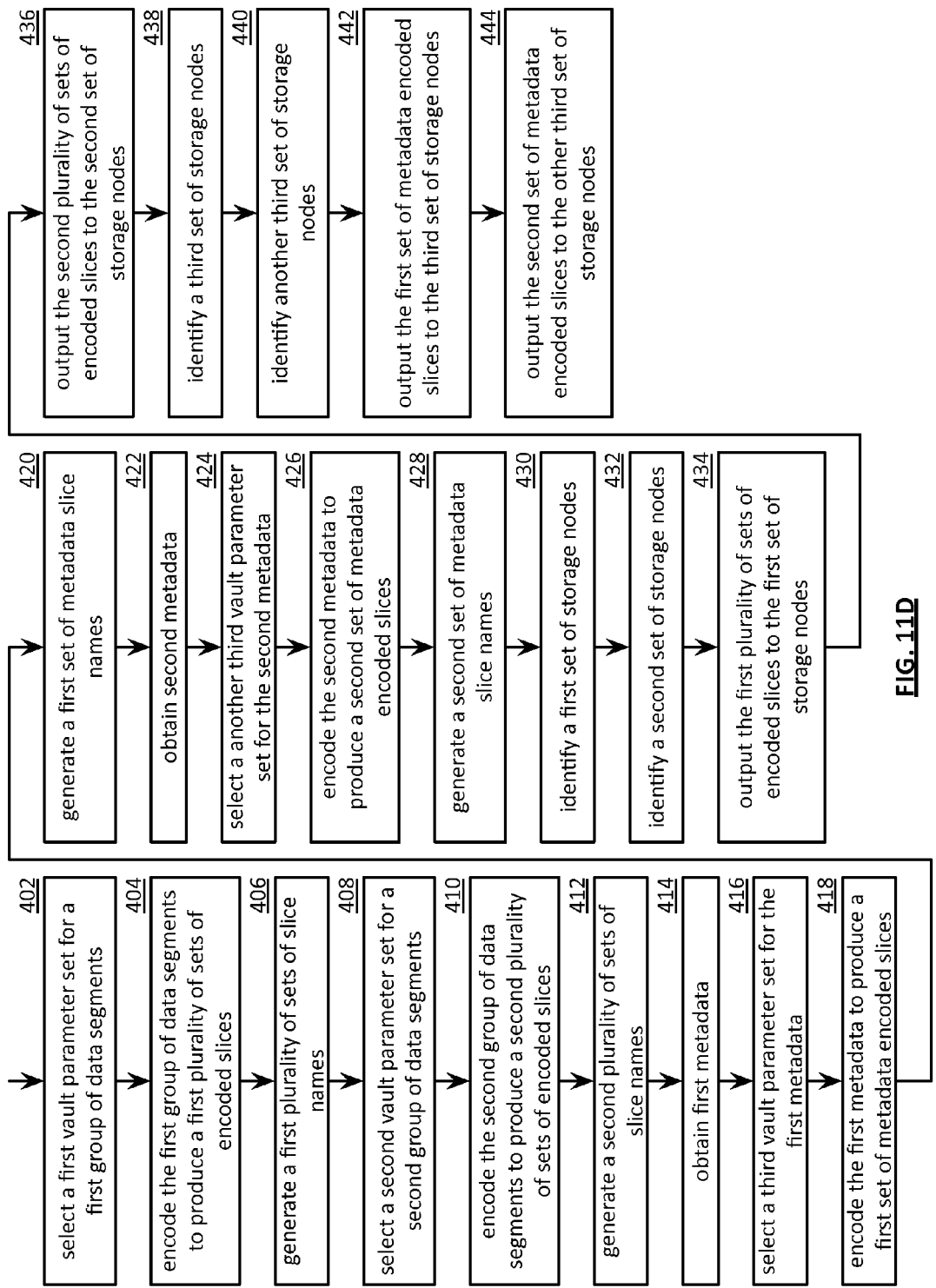
FIG. 11D is a flowchart illustrating another example of storing data in accordance with present invention.

FIG. 11D is a flowchart illustrating another example of storing data. For a first group of data segments, the method begins at step 402 where a processing module (e.g., of a dispersed storage processing unit) selects a first vault parameter set from a plurality of vault parameter sets. The first group of data segments consisting of one of a first file, a first data object, a first data block, a first data stream, and a first file directory object. The first vault parameter set includes a first set of parameters regarding dispersed error encoding data segments of the first group of data segments. The first set of parameters includes one or more of identity of a first dispersed storage error encoding algorithm (e.g., Reed Solomon, Cauchy Reed Solomon, rateless encoding, etc.), first error coding redundancy information (e.g., pillar width, decode threshold, write threshold, number of code blocks, etc.), and an identifier of a first set of storage nodes. The selecting the first vault parameter set may be based on one or more of identifying a storage requirement for the first group of data segments and interpreting metadata associated with the first group of data segments.

The method continues at step 404 where the processing module encodes the first group of data segments in accordance with the first vault parameter set to produce a first plurality of sets of encoded slices. For example, the processing module accesses a vault parameter table to identify a dispersed storage error coding algorithm associated with the first vault parameter set and encodes the first group of data segments utilizing the dispersed storage error coding algorithm to produce the first plurality of sets of encoded slices. The method continues at step 406 where the processing module generates a first plurality of sets of slice names for the first plurality of sets of encoded slices in accordance with the first vault parameter set. A slice name of the first plurality of sets of slice names includes a vault identifier, a first vault parameter set identifier (e.g., a vault region), and a common object name for the first group of data segments. The slice name of the first plurality of sets of slice names further includes a first slice index and a first segment number. The first slice index corresponds to a slice number within a set of the first plurality of sets of encoded slices and the first segment number corresponds to a data segment number of the first group of data segments.

For a second group of data segments, the method continues at step 408 where the processing module selects a second vault parameter set from the plurality of vault parameter sets. The second vault parameter set includes a second set of parameters regarding dispersed error encoding data segments of the second group of data segments. The second set of parameters includes one or more of identity of a second dispersed storage error encoding algorithm, second error coding redundancy information, and an identifier of a second set of storage nodes. The selecting the second vault parameter set may be based on one or more of identifying a storage requirement for the second group of data segments and interpreting metadata associated with the second group of data segments. The method continues at step 410 where the processing module encodes the second group of data segments in accordance with the second vault parameter set to produce a second plurality of sets of encoded slices.

The method continues at step 412 for the processing module generates a second plurality of sets of slice names for the second plurality of sets of encoded slices in accordance with the second vault parameter set. A slice name of the second plurality of sets of slice names includes the vault identifier, a second vault parameter set identifier, and a common object name for the second group of data segments. The slice name of the second plurality of sets of slice names further includes a second slice index and a second segment number. The second slice index corresponds to a slice number within a set of the second plurality of sets of encoded slices and the second segment number corresponds to a data segment number of the second group of data segments.

The method continues at step 414 where the processing module obtains first metadata regarding the first group of data segments. The obtaining includes at least one of retrieving, receiving, and generating. For example, the processing module analyzes the data to generate the metadata to include a data size indicator, a data type indicator, and a reliability requirement. For the first metadata, the method continues at step 416 where the processing module selects a third vault parameter set from the plurality of vault parameter sets. The third vault parameter set includes a third set of parameters regarding dispersed error encoding the first metadata. For example, the processing module selects the third vault parameter set associated with a highest level of reliability for encoding the first metadata.

The method continues at step 418 where the processing module encodes the first metadata in accordance with the third vault parameter set to produce a first set of metadata encoded slices. The method continues at the step where the processing module generates a first set of metadata slice names for the first set of metadata encoded slices in accordance with the third vault parameter set. A metadata slice name of the first set of metadata slice names includes the vault identifier, a third vault parameter set identifier, and the common object name for the first group of data segments.

The method continues at step 422 where the processing module obtains second metadata regarding the second group of data segments. For the second metadata, the method continues at step 424 where the processing module selects another third vault parameter set (e.g., same or different than the third vault parameter set for the first metadata) from the plurality of vault parameter sets. The other third vault parameter set includes another third set of parameters regarding dispersed error encoding the second metadata. For example, the processing module selects the third vault parameter set as the other third vault parameter set when a storage requirement for the second metadata is substantially the same as a storage compartment for the first metadata.

The method continues at step 426 where the processing module encodes the second metadata in accordance with the other third vault parameter set to produce a second set of metadata encoded slices. The method continues at step 428 where the processing module generates a second set of metadata slice names for the second set of metadata encoded slices in accordance with the other third vault parameter set. A metadata slice name of the second set of metadata slice names includes the vault identifier, another third vault parameter set identifier, and the common object name for the second group of data segments.

The method continues at step 430 where the processing module identifies a first set of storage nodes of a distributed storage network (DSN) based on the first vault parameter set. The method continues at step 432 where the processing module identifies a second set of storage nodes of the based on the second vault parameter set. The method continues at step 434 where the processing module outputs the first plurality of sets of encoded slices to the first set of storage nodes. The method continues at step 436 where the processing module outputs the second plurality of sets of encoded slices to the second set of storage nodes. The method continues at step 438 where the processing module identifies a third set of storage nodes based on the third vault parameter set. The method continues at step 440 where the processing module identifies another third set of storage nodes based on the other third vault parameter set. The method continues at step 442 where the processing module outputs the first set of metadata encoded slices to the third set of storage nodes. The method continues at step 444 where the processing module outputs the second set of metadata encoded slices to the other third set of storage nodes.

FIG. 12A is a flowchart illustrating another example of generating an access request. The method begins at step 446 where a processing module (e.g., of a user device) generates an access request that includes a username, a certificate authority (CA) domain name, and a user certificate. The CA domain name includes a name of an associated CA that signed the user certificate and may be included in a username field. The method continues at step 448 where the processor module outputs access request. For example, the processing module sends the access request to a dispersed storage (DS) unit to access an encoded data slice.

The method continues at step 450 where the processing module receives an authentication request. The authentication request includes a request to produce a result utilizing a private key by at least one of signing a message, encrypting the message, and decrypting the message. The method continues at step 452 where the processing module generates an authentication response to include the corresponding result. The method continues at step 454 where the processing module outputs the authentication response. For example, the processing module sends the authentication response to a requesting entity associated with the authentication request.

FIG. 12B is a flowchart illustrating another example of processing an access request. The method begins at step 456 where a processing module (e.g., of a dispersed storage (DS) unit) receives an access request that includes a user certificate. The method continues at step 458 where the processing module authenticates the user certificate. For example, the processing module sends an authentication request to a requesting entity of the access request, receives an authentication response, and indicates that the user certificate is authenticated when the authentication response is favorable (e.g., a returned signature is valid, comparing a decrypted encrypted received message to an original message is favorable, comparing a decrypted message to an original message is favorable). Such a step authenticates that the requesting entity is in possession of a private key utilized to produce the user certificate. When the user certificate is authenticated, the method continues at step 460 where the processing module extracts a username and a certificate authority (CA) domain name from the access request.

The method continues at step 462 where the processing module obtains a CA certificate utilizing the domain name. For example, the processing module sends a certificate request to a CA utilizing the CA domain name from the access request and receives the CA certificate in response. The method continues at step 464 where the processing module validates the signature of the user certificate utilizing the CA certificate. The processing module indicates that the signature of the user certificate is valid when the signature validation is favorable utilizing a public key from the CA certificate. The method continues at step 466 where the processing module facilitates access (e.g., write, read, delete, list, etc.) when the signature is validated.

As an example, an access request is received as: https://their_auth_providers_domain.com/dispersed-credentials-ca-certificate.pem". A "user_name" part of username may be linked to the certificate, either as part of a userid (UID) and a CommonName (CN) of a Subject Distinguished Name of the user certificate. These two parameters enable a service provider to verify uniqueness of the certificate as well as determine that it was issued by a correct CA. As such, centralization is avoided as anyone with a domain name could place their CA issuing certificate up and then have a dispersed credentials account which can be used to log into any website. The end user may renew their certificate so long as the Subject DN contains the appropriate field, and may even renew from a different CA so long as the user has the ability to update the CA hosted on their domain. Sites at which the user registers need only associate an account with a username of the form "user_name@their_auth_providers_domain.com", no knowledge of the certificate or a password need be pre-registered.

Figure 13A:
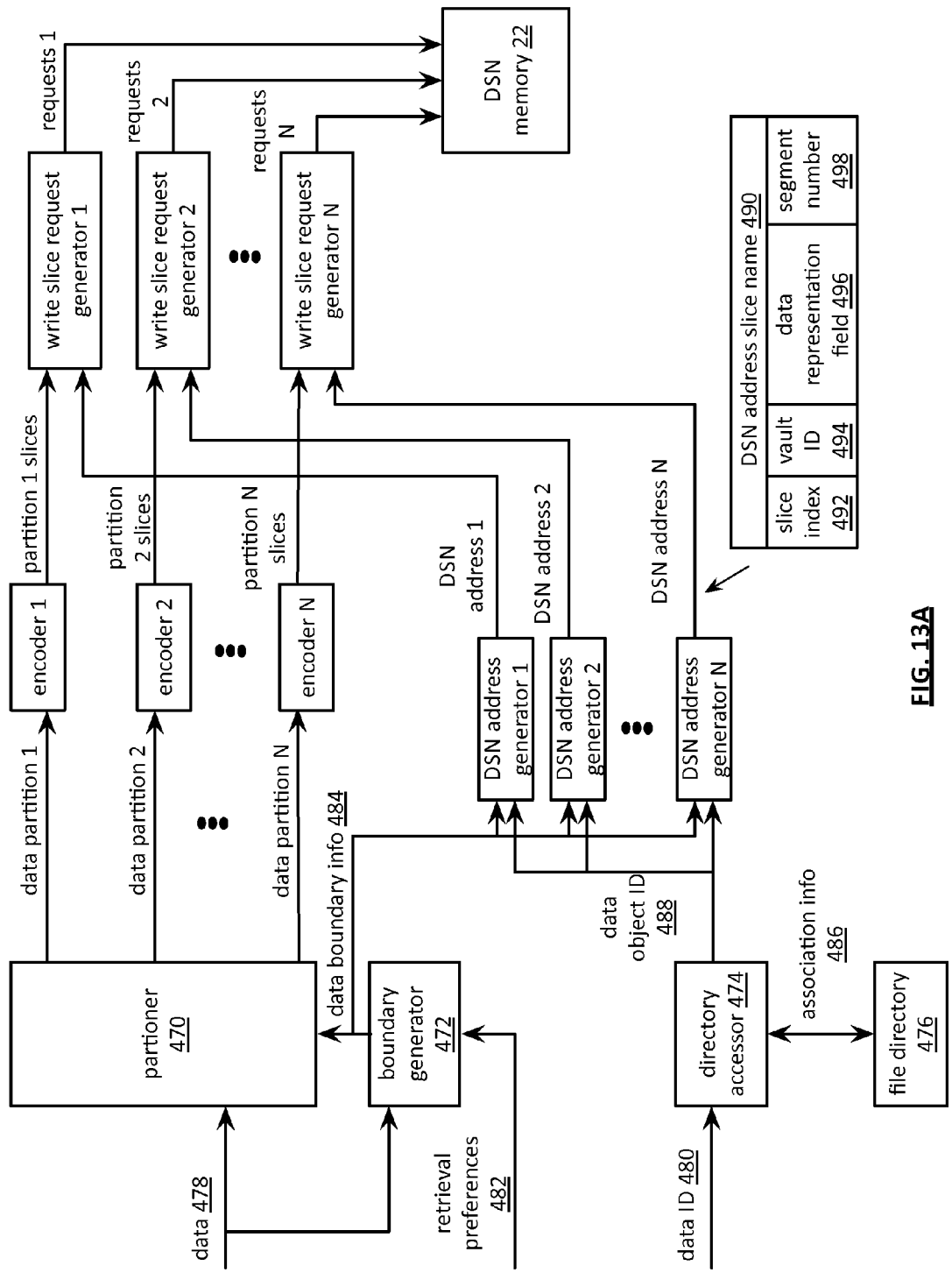
FIG. 13A is a schematic block diagram of an embodiment of a system for storing a large data object in a dispersed storage network (DSN) in accordance with the present invention.

FIG. 13A is a schematic block diagram of an embodiment of a system for storing a large data object in a dispersed storage network (DSN) that includes a partitioner 470, a boundary generator 472, a directory accessor 474, a file directory 476, a plurality of DSN address generators 1-N, a plurality of encoders 1-N, a plurality of write slice request generators 1-N, and a DSN memory 22. The system is operable to store data 478 in accordance with retrieval preferences 482 in the DSN memory 22.

The boundary generator 472 receives retrieval preferences 482. The receiving includes at least one of initiating a user query, receiving a user input, retrieving from a local memory, receiving from the DSN memory, and generating based on one or more of historical retrieval preferences, a dynamic analysis of the data 478, and performance of the DSN memory 22. A retrieval preference of the retrieval preferences 482 includes at least one of a keyword, a datatype, a previous retrieval preference, a data transition indicator, a pattern, a data value, and a data size.

The boundary generator 472 generates data boundary information 484 based on the retrieval preferences 482 and the data 478. The data boundary information 484 includes one or more of a boundary indicator between data partitions of a plurality of data partitions 1-N, a data element identifier associated with a data partition, a transition point designator, a data partition size indicator, a number of data partitions value, a data partition designator (e.g., partition 1 partition 2, etc.), and a data partition type indicator. The generating includes at least one of dividing a data size associated with the data 478 by a number of desired partitions to identify the partition size indicator of the data boundary information, dividing the data size associated with the data 478 by a desired data partition size to produce a number of data partitions indicator, detecting a datatype transition within the data 478 and identifying a boundary associated with the transition, and detecting a desired datatype of a data element within the data 478 and identifying a boundary associated with the data element.

The partitioner 470 partitions the data 478 into the plurality of data partitions 1-N in accordance with the data boundary information 484. For example, the partitioner 470 utilizes boundary designators of the data boundary information 484 to identify breakpoints between neighboring data partitions of the plurality of data partitions 1-N to form the neighboring data partitions. As another example, the partitioner 470 utilizes a partition size indicator for one or more data partitions to partition the plurality of data partitions 1-N. Each encoder of the plurality of encoders 1-N encodes a corresponding data partition utilizing a dispersed storage error coding function to produce a corresponding plurality of encoded partition slices of a plurality of pluralities of sets of encoded partition slices 1-N.

The directory accessor 474 receives a data identifier (ID) 480. The data ID 480 corresponds to the data 478. The data ID 480 may include one or more of a data name, a data object identifier, a data alias, an owner identifier, and vault ID. The directory accessor 474 may generate a data object ID 488 that corresponds to the data ID 480. The data object ID 488 corresponds to the data 478. The data object ID 488 includes at least one of a base source name, the vault ID, vault generation number, and an object number. The base source name includes the vault ID, the vault generation number, and the object number. The object number may be generated based on one of a random number and a deterministic function of one or more of the data ID 480 and a portion of the data 478. For example, the directory accessor 474 generates the object number as a random number. As another example, the directory accessor 474 performs a hashing function on the data ID to produce the data object ID 488. The directory accessor 474 associates the data ID 480 and the data object ID 488 to produce association information 486. The associating includes generating a file directory entry for a directory utilized to access the DSN memory 22. The directory accessor 474 facilitates storage of the association information 486 in the file directory 476.

Each DSN address generator of the plurality of DSN address generators 1-N generates a plurality of sets of DSN addresses for a corresponding set of partition encoded data slices based on the data object ID 488 and the data boundary information 484. The plurality of DSN address generators 1-N generates a plurality 1-N of the plurality of sets of DSN addresses for the plurality of plurality 1-N of partition encoded data slices. A DSN address of the plurality of sets of DSN addresses includes dispersed storage addressing information and a data representation value (e.g., forming a unique object number corresponding to the data portion). Such a DSN address may be represented as a slice name 490. The slice name 490 includes a slice index field 492, a vault ID field 494, a data representation field 496, and a segment number field 498. The slice index field 492 includes a slice index entry including at least one of a value derived from a pillar number, a slice number, and a pillar number of a width number of pillar number values. The vault ID field 494 includes a vault ID entry associated with the data 478. The segment number field 498 includes a segment number entry of a plurality of segment number values associated with a corresponding data partition of the plurality of data partitions 1-N. The data representation field 496 includes the data representation value associated with the data partition. The data representation value includes one or more of a representation of the data object ID 488, a representation of the retrieval preferences 482, and a representation of a corresponding portion of the data boundary information 484.

The DSN address generator generates the data representation value of the DSN address by generating one or more of the representation of the data object ID 488, the representation of the retrieval preferences 482, and the representation of the corresponding portion of the data boundary information 484. The DSN address generator generates a representation based on at least one of a value (e.g., data object ID, retrieval preference, data boundary info), a coding of the value (e.g., a numerical value as a representation corresponding to the value), and a deterministic function performed on the value (e.g., performing a hashing function on the value to produce the representation). Alternatively, or in addition to, the DSN address generator generates the data representation value by performing a further coding or deterministic function on a combination of the representation of the data object ID 488, the representation of the retrieval preferences 482, and the representation of the corresponding portion of the data boundary information 484. For example, the DSN address generator utilizes the data object ID 488 as is, generates a coded value for the retrieval preferences 482 (e.g., by a table lookup for coded values of retrieval preferences), performs a hashing function on a portion of the data boundary information 484 associated with the corresponding data partition to produce a hash digest representation of the data boundary information, and sums the data object ID 488, the coded value for the retrieval preferences, and the hash digest representation of the data boundary information to produce the data representation value.

Each write slice request generator of the plurality of write slice request generators 1-N generates a plurality of write slice requests that includes a corresponding plurality of partition encoded data slices and a corresponding plurality of DSN addresses. The write slice request generator outputs the plurality of write slice requests to the DSN memory 22.

Figure 13B:
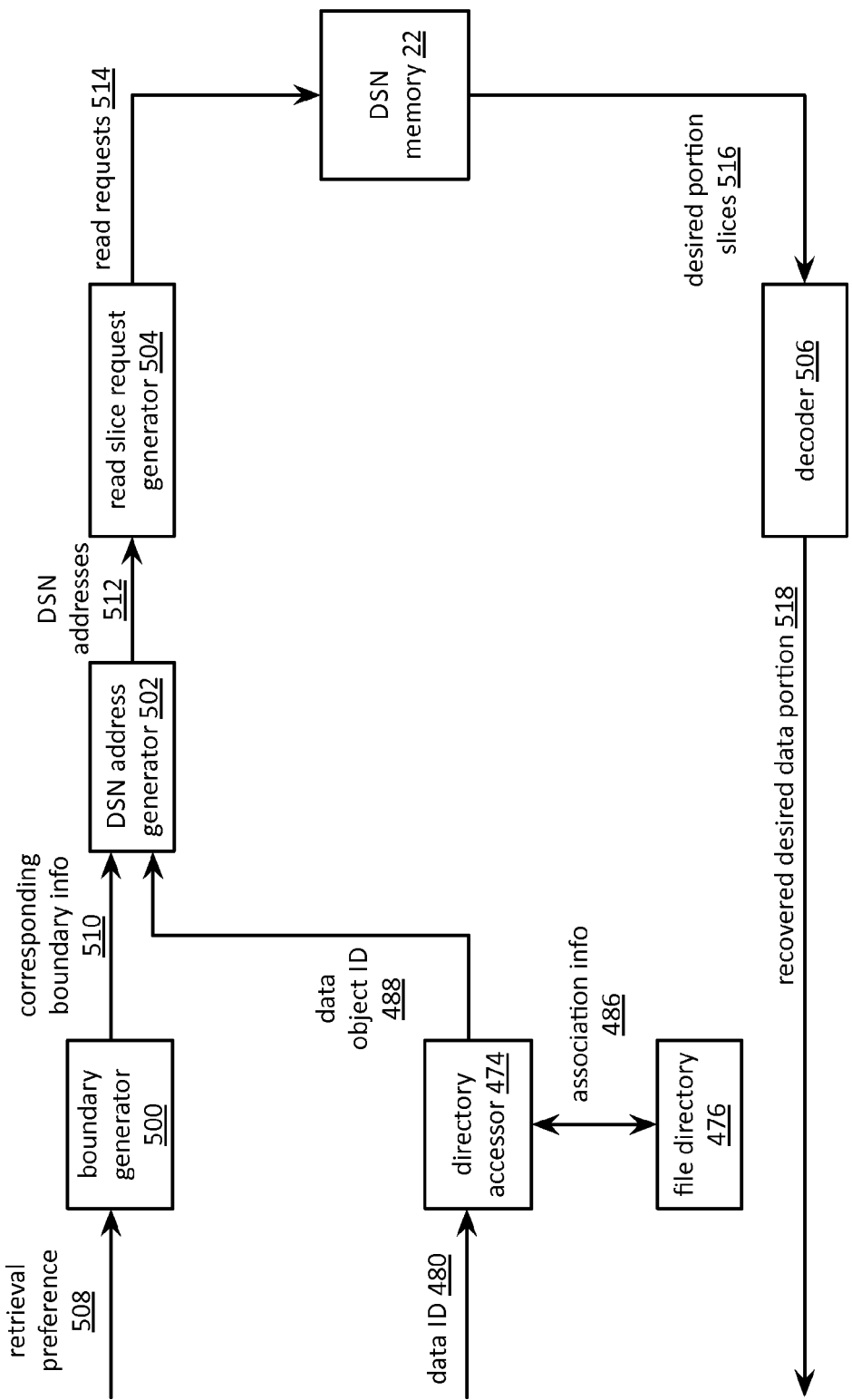
FIG. 13B is a schematic block diagram of an embodiment of a system for retrieving a large data object in a dispersed storage network (DSN) in accordance with the present invention.

FIG. 13B is a schematic block diagram of an embodiment of a system for retrieving a large data object in a dispersed storage network (DSN) that includes a boundary generator 500, a directory accessor 474, a file directory 476, a DSN address generator 502, a read slice request generator 504, a DSN memory 22, and a decoder 506. The system functions to retrieve a recovered desire data portion 518 of data from the DSN memory 22 based on a retrieval preference 508 and a data identifier (ID) 480.

The directory accessor 474 receives the data identifier (ID) 480. The data ID 480 corresponds to the data. The data ID 480 may include one or more of a data name, a data object identifier, a data alias, an owner identifier, and vault ID. The file directory 476 includes association information 486. The association information 486 associates the data ID 480 and a data object ID 488. The data object ID 488 includes at least one of a base source name, the vault ID, vault generation number, and an object number. The base source name includes the vault ID, the vault generation number, and the object number. The object number may be generated based on one of a random number and a deterministic function of one or more of the data ID 480 and a portion of the data. The directory accessor 474 retrieves the association information 486 from the file directory 476 based on the data ID 480. The directory accessor 474 outputs the data object ID 488 to the DSN address generator 502.

The boundary generator 500 receives the retrieval preference 508 from a requesting entity to retrieve the desired data portion 518. The receiving includes at least one of initiating a user query, receiving a user input, retrieving from a local memory, receiving from the DSN memory, and generating based on one or more of historical retrieval preference and a dynamic analysis of the data. The retrieval preference 508 includes at least one of a keyword, a datatype, a previous retrieval preference, a data transition indicator, a pattern, a data value, and a data size.

The boundary generator 500 generates corresponding boundary information 510 based on the retrieval preference 508. The corresponding boundary information 510 includes one or more of a boundary indicator associated with a data partition corresponding to the desired data portion 518, a data element identifier associated with the data partition, a transition point designator, a data partition index, and a data size indicator. The generating includes at least one of dividing a data size associated with the data by a number of estimated partitions to identify a partition size indicator of the data boundary information, dividing the data size associated with the data by a known data partition size to produce a number of data partitions indicator, identifying a boundary associated with the transition, identifying a boundary associated with the desire data portion, performing a deterministic function on the retrieval preference, retrieving the boundary information 510 from a table based on indexing into the table utilizing the retrieval preference 508, and receiving the boundary information 510. For example, the processing module calculates a coded value for the retrieval preference 508 by performing a hashing function on the retrieval preference 508 and performs a mask generating function on the coded value to generate the boundary information 510.

The DSN address generator 502 generates a plurality of sets of DSN addresses 512 based on the corresponding boundary information 510 in the data object ID 488. A DSN address of the plurality of sets of encoded DSN addresses 512 includes a representation of the data object ID 488, a representation of the retrieval preference 508 (e.g., via the boundary info), a representation of the corresponding data boundary information 510, and dispersed storage addressing information. The DSN address includes the dispersed storage addressing information and a data representation value (e.g., a unique object number corresponding to the desired data portion) that includes the representation of the data object identifier, the representation of the retrieval preference, and the representation of the corresponding data boundary information.

The DSN address generator 502 may generate the data representation value as a resultant of a deterministic function being performed on the data object ID 488 and the representation of the retrieval preference and the representation of the corresponding data boundary information. For example, the processing module generates a data representation value as a sum of the data object ID 488 and a resultant of a hashing function being performed on a retrieval preference for a video scene that includes an ocean. As another example, the processing module generates another data representation value as a sum of the data object identifier and a resultant of a hashing function being performed on a desired video scene transition portion of a data boundary associated with video of the ocean.

The read slice request generator 504 generates a plurality of sets of read slice request 514 that includes the plurality of DSN addresses 512. To read slice request generator 504 outputs the plurality of sets of read slice request 514 for the DSN memory 22. The decoder 506 receives desired portion slices 516 that includes at least a decode threshold number of encoded data slices per set of a plurality of sets of encoded data slices corresponding to the desired data portion 518.

The decoder 506 decodes the desired portion slices 516 utilizing a dispersed storage error coding function to produce the recovered desire data portion 518.

FIG. 13C is a schematic block diagram of another embodiment of a system for storing a large data object in a dispersed storage network (DSN) that includes a computing device 520 and a DSN memory 22. The DSN memory 22 includes a plurality of storage nodes 106. Each storage node 106 of the plurality of storage nodes 106 may be implemented utilizing at least one of a dispersed storage (DS) unit, a storage server, a DS processing unit, and a user device. The computing device 520 includes a DS module 522. The computing device 520 may be implemented utilizing at least one of a DS unit, a DS processing unit, and a user device. The DS module 522 includes a generate identifier (ID) module 524, a partition module 526, an encode module 528, and a generate addresses module 530. The system functions to store data 478 as a plurality of data partitions 532 in the DSN memory 22 based on retrieval preferences 482. For example, the computing device 520 is implemented as a DS processing unit to store the data 478 in the DSN memory 22.

The generate ID module 524 generates a data object identifier 488 for data 478 to be stored in the DSN memory 22. For example, the generate ID module 524 generates an object number value of a source name field as the data object identifier 488 based on a random number generator. Alternatively, the generate ID module 524 performs a deterministic function on at least a portion of the data 478 to generate the data object identifier 488. The deterministic function includes at least one of a hashing function, an addition function, a subtraction function, an exclusive OR logical function, a cyclic redundancy check function, a hash-based message authentication code (HMAC) function, and a mask generating function (MGF). For example, the generate ID module 524 performs the MGF on a first portion (e.g., 1 million bytes) of the data 478 to produce the data object identifier 488 with a desired number of bits for the object number value.

The partition module 526 partitions the data 478 into a plurality of data partitions 532 based on a set of retrieval preferences 482 and data boundary information 484. The partition module 526 obtains the data boundary information 484 by at least one of receiving and generating. The generating may be based on one or more of the retrieval preferences 482 and the data 478. For example, the partition module 526 analyzes the data 478 based on a retrieval preference 482 associated with video scenes to produce data boundary information 484 that includes an identification of a data element associated with an ocean video scene. The partition module 526 may further analyze the data 478 in accordance with the data boundary information 484 to identify data elements of the data 478 that correspond to a retrieval preference of the set of retrieval preferences 482 to determine a plurality of data boundaries corresponding to the plurality of data partitions. The partition module 526 may insert the data boundary information 484 into the data 478 enabling subsequent enhanced content identification during a retrieval sequence.

For a data partition of the plurality of data partitions 532, the encode module 528 dispersed storage error encodes the data partition to produce a plurality of sets of encoded data slices 534. For the data partition of the plurality of data partitions 532, the generate addresses module 530 generates a plurality of sets of DSN addresses 536 (e.g., new slice name format) for the plurality of sets of encoded data slices 534. A DSN address of the plurality of sets of DSN addresses 536 includes a representation of the data object identifier, a representation of one or more retrieval preferences of the set of retrieval preferences, a representation of a corresponding portion of the data boundary information, and dispersed storage addressing information. The DSN address includes the dispersed storage addressing information and a data representation value (e.g., a unique object number corresponding to the data portion) that includes the representation of the data object identifier, the representation of one or more retrieval preferences of the set of retrieval preferences, and the representation of the corresponding portion of the data boundary. The dispersed storage addressing information includes a storage node identifier (e.g., a slice index), a data segment number corresponding to a data segment of the data portion, a vault identifier that identifies user device information associated with the data. The data partition can be retrieved from storage by obtaining the data object identifier 488 via a file directory access and calculating the plurality of sets of DSN addresses 536 based on the data object identifier 488 and the one or more retrieval preferences 482.

The generate address module 530 may generate the data representation value as a resultant of a deterministic function being performed on the data object identifier 488 and the representation of one or more of the one or more retrieval preferences of the set of retrieval preferences 482 and the representation of the corresponding portion of the data boundary. For example, the generate address module 530 generates a data representation value as a sum of the data object identifier 488 and a resultant of a hashing function being performed on a retrieval preference for a video scene that includes an ocean. As another example, the generate address module 530 generates another data representation value as a sum of the data object identifier 488 and a resultant of a hashing function being performed on a desired video scene transition portion of the data boundary associated with video of the ocean.

The representation of the data object identifier includes one of a DSN base source name that is generated from the data object identifier, a resultant of a deterministic function being performed on the data object identifier, and the data object identifier. The representation of one or more retrieval preferences includes one of a code value representing a retrieval preference of the one or more retrieval preferences, a resultant of a deterministic function being performed on the one or more retrieval preferences, and the one or more retrieval preferences. The representation of a corresponding portion of the data boundary information includes one of a code value representing the corresponding portion of the data boundary information, a resultant of a deterministic function being performed on the corresponding portion of the data boundary information, and the corresponding portion of the data boundary information.

For the data partition of the plurality of data partitions 532, the DS module 522 generates a plurality of sets of write slice requests 538 that includes the plurality of sets of encoded data slices 534 and a corresponding plurality of sets of DSN addresses 536. The DS module 522 outputs the plurality of sets of write slice requests 538 to the DSN memory 22.

Figure 13D:
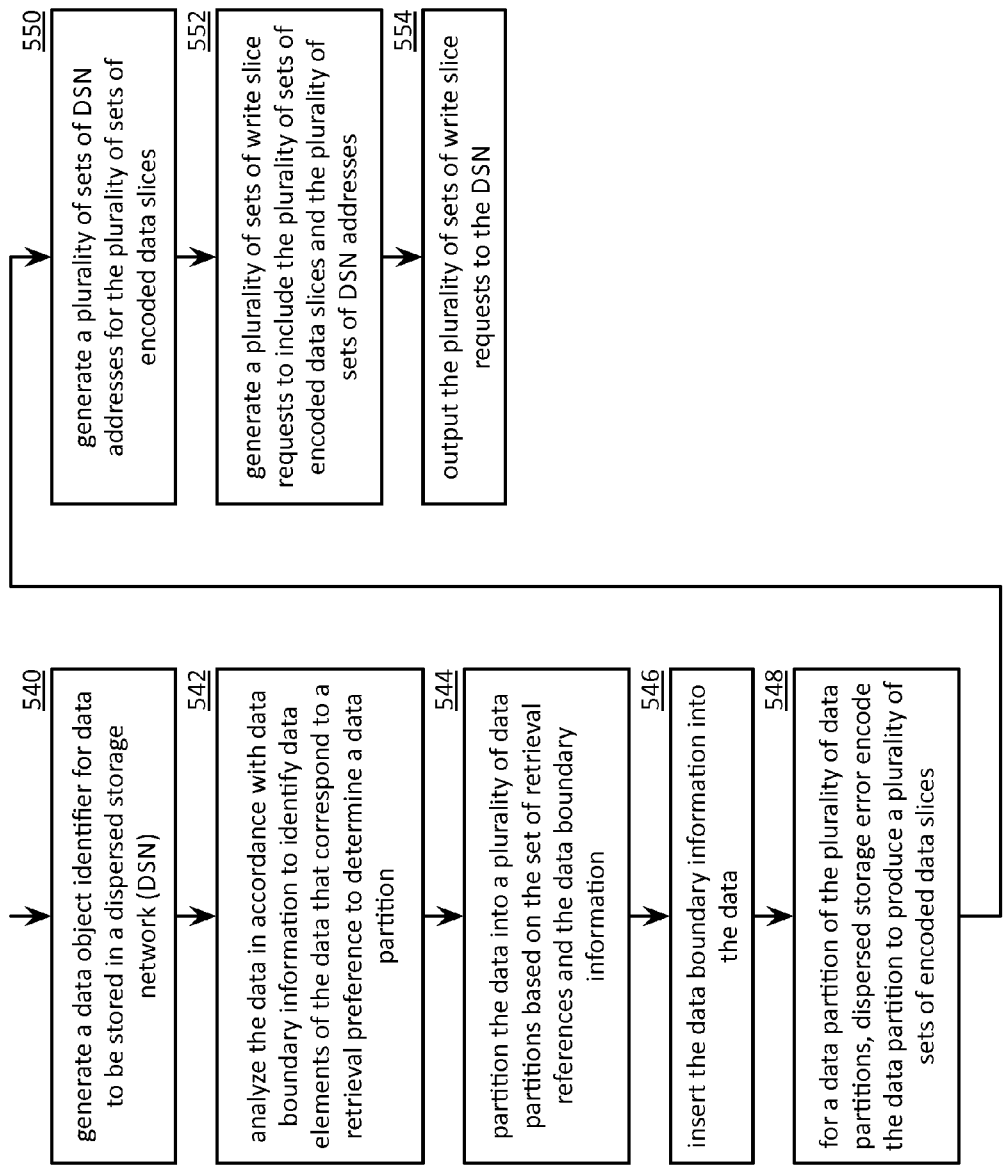
FIG. 13D is a flowchart illustrating another example of storing data in accordance with the present invention.

FIG. 13D is a flowchart illustrating another example of storing data. The method begins at step 540 were a processing module (e.g., of a dispersed storage (DS) processing unit) generates a data object identifier for data to be stored in a dispersed storage network (DSN). The method continues at step 542 where the processing module analyzes the data in accordance with data boundary information to identify data elements of the data that correspond to a retrieval preference of a set of retrieval preferences to determine the data partition. The method continues at step 544 where the processing module partitions the data into a plurality of data partitions based on the set of retrieval preferences and the data boundary information. The method continues at step 546 where the processing module inserts the data boundary information into the data.

For a data partition of the plurality of data partitions, the method continues at step 548 where the processing module dispersed storage error encodes the data partition to produce a plurality of sets of encoded data slices. The method continues at step 550 where the processing module generates a plurality of sets of DSN addresses for the plurality of sets of encoded data slices. A DSN address of the plurality of sets of DSN addresses includes a representation of the data object identifier, a representation of one or more retrieval preferences of the set of retrieval preferences, a representation of a corresponding portion of the data boundary information, and dispersed storage addressing information. The data partition can be retrieved from storage by obtaining the data object identifier via a file directory access and calculating the plurality of sets of DSN addresses based on the data object identifier and the one or more retrieval preferences.

The representation of the data object identifier includes one of a DSN base source name that is generated from the data object identifier, a resultant of a deterministic function being performed on the data object identifier, and the data object identifier. The representation of one or more retrieval preferences includes one of a code value representing a retrieval preference of the one or more retrieval preferences, a resultant of a deterministic function being performed on the one or more retrieval preferences, and the one or more retrieval preferences. The representation of a corresponding portion of the data boundary information includes one of a code value representing the corresponding portion of the data boundary information, a resultant of a deterministic function being performed on the corresponding portion of the data boundary information, and the corresponding portion of the data boundary information. The dispersed storage addressing information includes a storage node identifier (e.g., a slice index), a data segment number corresponding to a data segment of the data portion, and a vault identifier that identifies user device information associated with the data.

The method continues at step 552 where the processing module generates a plurality of sets of write slice requests that includes the plurality of sets of encoded data slices and the plurality of sets of DSN addresses. The method continues at step 554 where the processing module outputs the plurality of sets of write slice requests to the DSN.

Figure 13E:
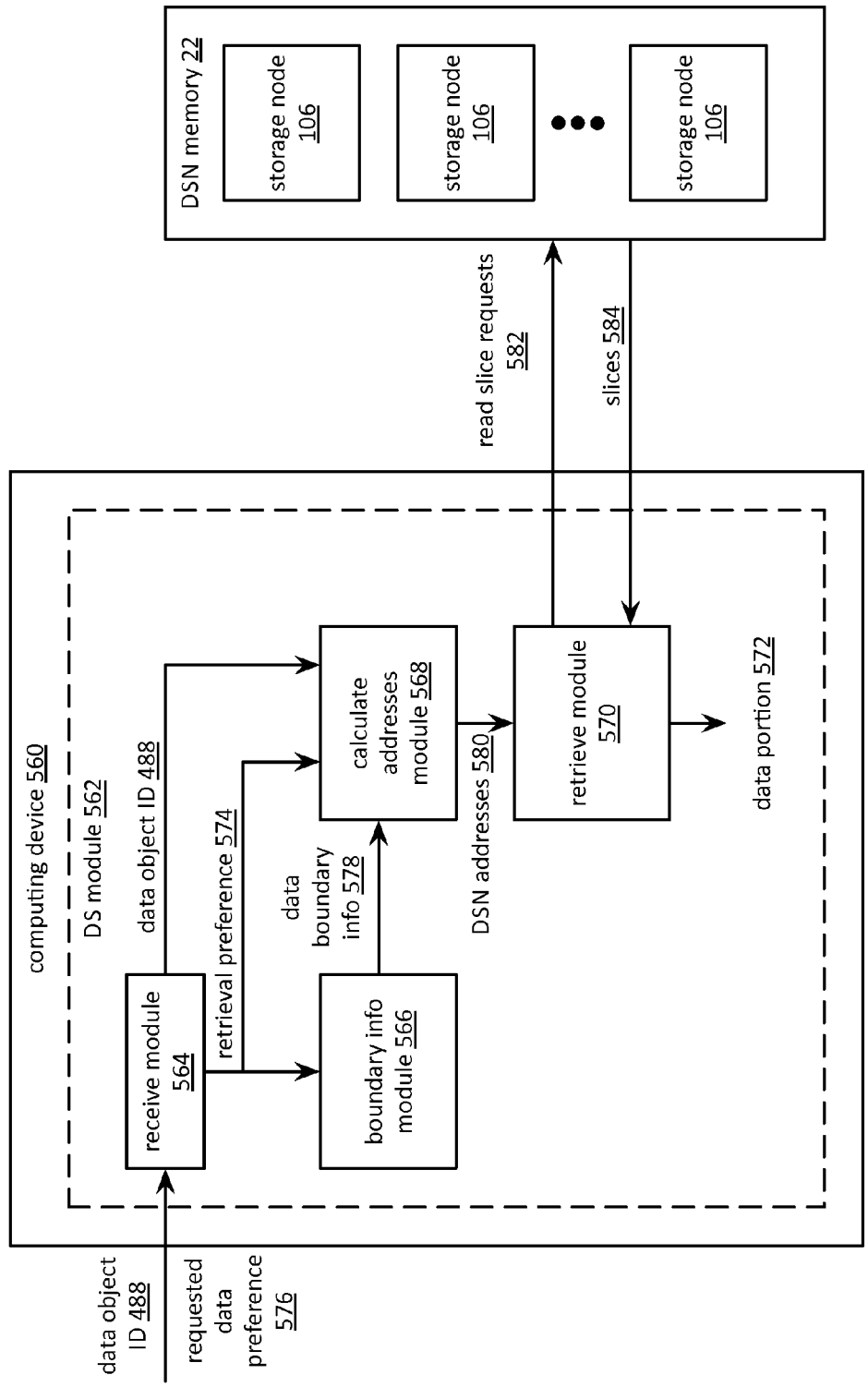
FIG. 13E is a schematic block diagram of another embodiment of a system for retrieving a large data object in a dispersed storage network (DSN) in accordance with the present invention.

FIG. 13E is a schematic block diagram of another embodiment of a system for retrieving a large data object in a dispersed storage network (DSN) that includes a computing device 560 and a DSN memory 22. The DSN memory 22 includes a plurality of storage nodes 106. Each storage node 106 of the plurality of storage nodes 106 may be implemented utilizing at least one of a dispersed storage (DS) unit, a storage server, a DS processing unit, and a user device. The computing device 560 includes a DS module 562. The computing device 560 may be implemented utilizing at least one of a DS unit, a DS processing unit, and a user device. The DS module 562 includes a receive module 564, a boundary info module 566, a calculate addresses module 568, and a retrieve module 570. The system functions to retrieve a data portion 572 of data stored in the DSN memory 22 based on a retrieval preference 574. For example, the computing device 560 is implemented as a DS processing unit to retrieve the data portion 572 from the DSN memory 22.

The receive module 564 receives a data object identifier 488 via a file directory access. The data object identifier 488 identifies data stored in the DSN memory 22. The receive module 564 receives the retrieval preference 574 (e.g., a partition attribute) to retrieve the data portion 572 of the data. The receive module 546 receives the retrieval preference 574 by receiving a requested data preference 576 and equating the requested data preference 576 to one or more preferences of a set of retrieval preferences to produce the retrieval preference 574. The equating includes at least one of a best matching, and interactive selection process and a selection from a list.

The boundary information module 566 determines corresponding data boundary information 578 based on the retrieval preference 574. The boundary information module 566 identifies a data element based on the retrieval preference 574 to produce the data boundary information 578. For example, the boundary information module 566 identifies a video scene transition as the boundary information 578 based on a new video scene retrieval preference 574.

The calculate addresses module 568 calculates a plurality of sets of DSN addresses 580 based on the data object identifier 488, the retrieval preference 574, and the corresponding data boundary information 578. A DSN address of the plurality of sets of encoded DSN addresses 580 includes a representation of the data object identifier, a representation of the retrieval preference, a representation of the corresponding data boundary information, and dispersed storage addressing information. The representation of the data object identifier includes one of a DSN base source name that is generated from the data object identifier 488, a resultant of a deterministic function being performed on the data object identifier, and the data object identifier 488. The representation of one or more retrieval preferences includes one of a code value representing a retrieval preference of the retrieval preference, a resultant of a deterministic function being performed on the retrieval preference 574, and the retrieval preference 574. The representation of the corresponding data boundary information includes one of a code value representing the corresponding data boundary information, a resultant of a deterministic function being performed on the corresponding the data boundary information 578, and the corresponding data boundary information 578. The dispersed storage addressing information includes a storage node identifier, (e.g., a pillar index), a data segment number corresponding to a data segment of the data portion 572, and a vault identifier that identifier user device information associated with the data.

The retrieve module 570 retrieves the data portion 572 based on the plurality of sets of DSN addresses 580. The retrieve module 570 generates a plurality of sets of read slice requests 582 that includes the plurality of sets of DSN addresses 580. The retrieve module 570 outputs the plurality of sets of read slice requests 582 to the DSN memory 22. The retrieve module 570 receives at least a decode threshold number of encoded data slices per set of encoded data slices of a plurality of sets of encoded data slices corresponding to the plurality of sets of DSN addresses 580. The retrieve module 570 decodes the at least the decode threshold number of encoded data slices per set of encoded data slices of the plurality of sets of encoded data slices to reproduce the data portion 572.

Figure 13F:
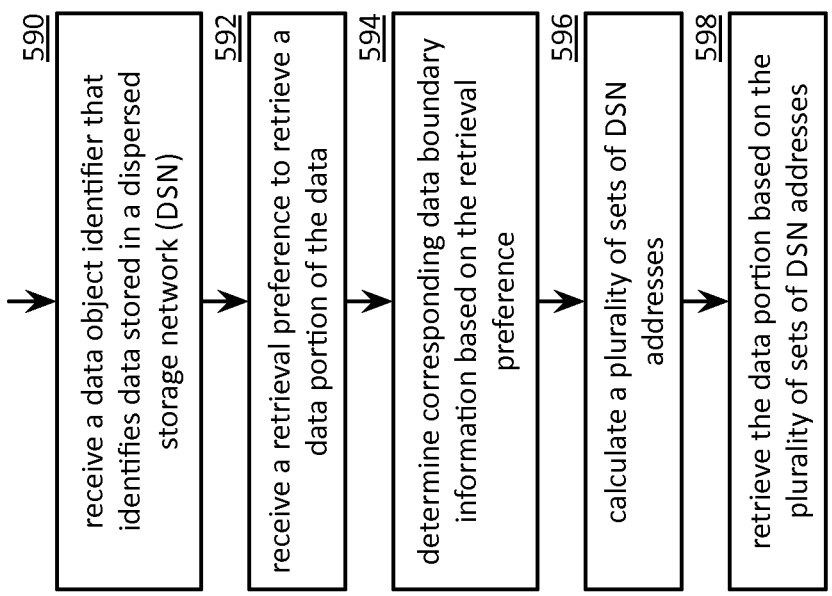
FIG. 13F is a flowchart illustrating an example of retrieving data in accordance with the present invention.

FIG. 13F is a flowchart illustrating an example of retrieving data. The method begins at step 590 where a processing module (e.g., of a dispersed storage (DS) processing unit) receives a data object identifier (e.g., a base source name) via a file directory access. Alternatively, the processing module receives the data object identifier from a requesting entity. The data object identifier identifies data stored in a dispersed storage network (DSN). The data object may be stored in the DSN as a plurality of partitions. The method continues at step 592 where the processing module receives a retrieval preference (e.g., a partition attribute) to retrieve a data portion of the data. The receiving the retrieval preference includes receiving a requested data preference and equating the requested data preference to one or more preferences of a set of retrieval preferences to produce the retrieval preference. The processing module may obtain the set of retrieval preferences by one or more of receiving, retrieving from a memory, retrieving from the DSN, obtaining from a user, and generating based on user input.

The method continues at step 594 where the processing module determines corresponding data boundary information based on the retrieval preference. The determining may be based on one or more of performing a deterministic function on the retrieval preference to generate the data boundary information, retrieving the data boundary information from a table based on indexing into the table utilizing the retrieval preference, and receiving the data boundary information. For example, the processing module calculates a coded value for the retrieval preference by performing a hashing function on the retrieval preference and performs a mask generating function on the coded value to generate the data boundary information.

The method continues at step 596 where the processing module calculates a plurality of sets of DSN addresses based on the data object identifier, the retrieval preference, and the corresponding data boundary information. A DSN address of the plurality of sets of encoded DSN addresses includes a representation of the data object identifier, a representation of the retrieval preference, a representation of the corresponding data boundary information, and dispersed storage addressing information. The DSN address includes the dispersed storage addressing information and a data representation value (e.g., a unique object number corresponding to the data portion) that includes the representation of the data object identifier, the representation of the retrieval preference, and the representation of the corresponding data boundary information.

The processing module may generate the data representation value as a resultant of a deterministic function being performed on the data object identifier and the representation of the retrieval preference and the representation of the corresponding data boundary information. For example, the processing module generates a data representation value as a sum of the data object identifier and a resultant of a hashing function being performed on a retrieval preference for a video scene that includes an ocean. As another example, the processing module generates another data representation value as a sum of the data object identifier and a resultant of a hashing function being performed on a desired video scene transition portion of a data boundary associated with video of the ocean.

The representation of the data object identifier includes one of a DSN base source name that is generated from the data object identifier, a resultant of a deterministic function being performed on the data object identifier, and the data object identifier. The representation of the retrieval preference includes one of a code value representing a retrieval preference of the retrieval preference, a resultant of a deterministic function being performed on the retrieval preference, and the retrieval preference. The representation of the corresponding data boundary information includes one of a code value representing the corresponding data boundary information, a resultant of a deterministic function being performed on the corresponding the data boundary information, and the corresponding data boundary information. The dispersed storage addressing information includes a storage node identifier (e.g., a pillar index), a data segment number corresponding to a data segment of the data portion, and a vault identifier that identifier user device information associated with the data.

The method continues at step 598 where the processing module retrieves the data portion based on the plurality of sets of DSN addresses. For example, the processing module generates a plurality of sets of read requests that includes the plurality of sets of DSN addresses and outputs the plurality of sets of read requests to the DSN. The processing module receives at least a decode threshold number of encoded data slices per set of encoded data slices of a plurality of sets of encoded data slices corresponding to the plurality of sets of DSN addresses. The processing module decodes the at least the decode threshold number of encoded data slices per set of encoded data slices of the plurality of sets of encoded data slices to produce the data portion.

Figure 14:
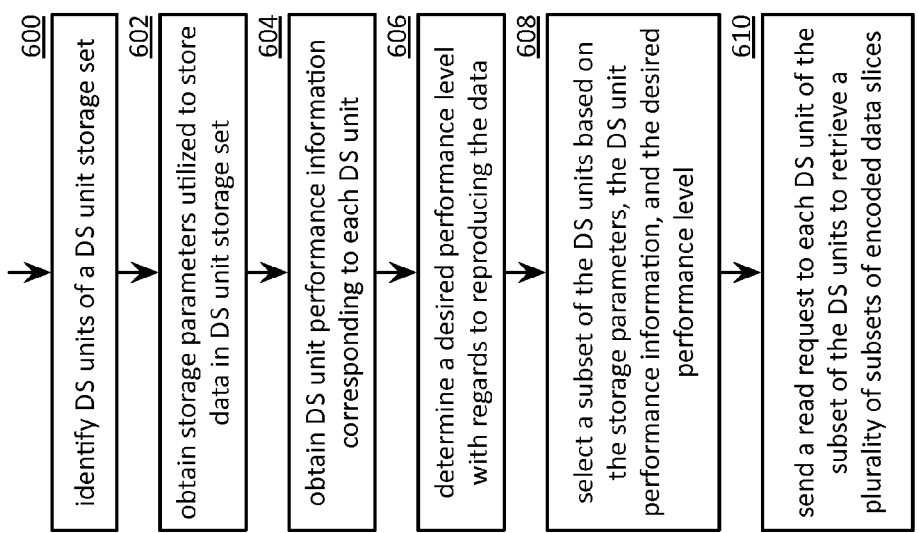
FIG. 14 is a flowchart illustrating another example of retrieving data in accordance with the present invention.

FIG. 14 is a flowchart illustrating another example of retrieving data. The method begins at step 600 where a processing module (e.g., of a dispersed storage (DS) processing unit) identifies DS units of a DS unit storage set. The identifying includes at least one of reproducing a dispersed storage network (DSN) address (e.g., a source name, a slice name) based on a filename of the data to be retrieved, extracting DS unit identifiers (IDs) of the DS unit storage set from a DSN address to physical location table lookup, receiving the DS unit IDs, and a query.

The method continues at step 602 where the processing module obtains storage parameters utilized to store data in the DS unit storage set. The obtaining includes at least one of a lookup, a retrieval, a query, and receiving the parameters. For example, the processing module extracts the parameters from a vault associated with the data. The method continues at step 604 where the processing module obtains DS unit performance information corresponding to each DS unit of the DS unit storage set. The DS unit performance information includes one or more of a number of timed out requests, a number of failed requests as a percentage of total requests for each connection to the DS unit, an overall failure rate, an access bandwidth indicator, an access latency indicator, and an availability indicator. The obtaining includes at least one of a lookup, a retrieval, a query, and receiving the information. For example, the processing module accesses a DS unit history record to extract the DS unit performance information.

The method continues at step 606 where the processing module determines a desired performance level with regards to reproducing the data. The performance level includes metrics of the issuer performance information. The determining may be based on at least one of the DS unit performance information, a data type of the data, a desired performance level based on data type list, a lookup, a retrieval, a query, and receiving the information. For example, the processing module determines that the desired performance level includes a maximum failure rate of reproducing the data in a first attempt as 0.1% based on a desire performance level list lookup.

The method continues at step 608 where the processing module selects a subset of the DS units based on one or more of the storage parameters, the DS unit performance information, and the desire performance level. For example, the processing module chooses a number of DS units based on a desire performance level and subsequently selects the number of DS units such that a probability of a successful reproduction of the data is greater than a probability of successful reproduction of the data associated with the desired performance level. The method continues at step 610 where the processing module sends a read request to each DS unit of the subset of DS units to retrieve a plurality of subsets of encoded data slices. The processing module receives at least a decode threshold number of encoded data slices per set of the plurality of sets of encoded data slices to enable a successful reproduction of the data, wherein the probability of successful reproduction of the data is greater than the successful reproduction of the data probability associated with the desire performance level. A network congestion system improvement may be provided such that read requests are sent to the subset of DS units and not to a full pillar width of DS units of the DS unit storage set.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for copying a data object in a dispersed storage network (DSN) without replication, the method comprises:

receiving a request to copy the data object, wherein the data object is already stored in the DSN as a one or more sets of encoded data slices based on a dispersed storage error coding function and wherein the one or more sets of encoded data slices have associated therewith one or more sets of original slice names, wherein the one or more sets of original slice names corresponds to DSN addressing information of the one or more sets of encoded data slices; and in response to the request to copy the data object:

generating one or more sets of at least a decode threshold of new slice names for the one or more sets of encoded data slices, wherein the one or more sets of at least the decode threshold of new slice names corresponds to alternative DSN addressing information of the one or more sets of encoded data slices, and wherein each new slice name includes at least a first field having a value identical to a corresponding first field in an original slice name and at least a second field having a value different from a corresponding second field in the original slice name;

identifying storage nodes of the DSN based on the one or more sets of new slice names;

sending the one or more sets of at least a decode threshold of new slice names to the storage nodes of the DSN for storage therein; and instructing the storage nodes to link the one or more sets of at least a decode threshold of new slice names to a corresponding at least a decode threshold number of encoded data slices of the one or more sets of encoded data slices thereby producing a non-replicated copy of the data object.

2. The method of claim 1, wherein the request to copy comprises at least one of:

a snapshot request;

a component of a duplication request; and a component of a backup request.

3. The method of claim 1, wherein the generating the one or more sets of at least a decode threshold of new slice names comprises:

generating the one or more sets of at least a decode threshold of new slice names in accordance with the dispersed storage error coding function.

4. The method of claim 1, wherein the generating the one or more sets of at least a decode threshold of new slice names comprises:

sending a request to generate the one or more sets of new slices names to the storage nodes, wherein:

a first storage node of the storage nodes generates a first slice name for each of the one or more sets of at least a decode threshold of new slice names in accordance with the dispersed storage error coding function; and a second storage node of the storage nodes generates a second slice name for each of the one or more sets of at least a decode threshold of new slice names in accordance with the dispersed storage error coding function.

5. The method of claim 1, wherein the instructing to link comprises:

instructing a first storage node of the storage nodes to update a first slice location table to link a first new slice name of the one or more sets of at least a decode threshold of new slice names to a first slice name of the one or more sets of slice names for a first encoded data slice of the one or more sets of encoded data slices; and instructing a second storage node of the storage nodes to update a second slice location table to link a second new slice name of the one or more sets of at least a decode threshold of new slice names to a second slice name of the one or more sets of slice names for a second encoded data slice of the one or more sets of encoded data slices.

6. A dispersed storage (DS) module comprises:

a first module, when operable within a computing device, causes the computing device to:

receive a request to copy a data object, wherein the data object is already stored in a dispersed storage network (DSN) as a one or more sets of encoded data slices based on a dispersed storage error coding function and wherein the one or more sets of encoded data slices have associated therewith one or more sets of original slice names, wherein the one or more sets of original slice names corresponds to DSN addressing information of the one or more sets of encoded data slices;

a third module, when operable within the computing device, causes the computing device to:

generate one or more sets of at least a decode threshold of new slice names for the one or more sets of encoded data slices, wherein the one or more sets of at least the decode threshold of new slice names corresponds to alternative DSN addressing information of the one or more sets of encoded data slices, and wherein each new slice name includes at least a first field having a value identical to a corresponding first field in an original slice name and at least a second field having a value different from a corresponding second field in the original slice name; and a fourth module, when operable within the computing device, causes the computing device to:

identify storage nodes of the DSN based on the one or more sets of new slice names; send the one or more sets of at least a decode threshold of new slice names to the storage nodes of the DSN for storage therein; and instruct the storage nodes to link the one or more sets of at least a decode threshold of new slice names to a corresponding at least a decode threshold number of encoded data slices of the one or more sets of encoded data slices thereby producing a non-replicated copy of the data object.

7. The DS module of claim 6, wherein the request to copy comprises at least one of:

a snapshot request;

a component of a duplication request; and a component of a backup request.

8. The DS module of claim 6, wherein the third module functions to generate the one or more sets of at least a decode threshold of new slice names by:

generating the one or more sets of at least a decode threshold of new slice names in accordance with the dispersed storage error coding function.

9. The DS module of claim 6, wherein the third module functions to generate the one or more sets of at least a decode threshold of new slice names by:

sending a request to generate the one or more sets of new slices names to the storage nodes, wherein:

a first storage node of the storage nodes generates a first slice name for each of the one or more sets of at least a decode threshold of new slice names in accordance with the dispersed storage error coding function; and a second storage node of the storage nodes generates a second slice name for each of the one or more sets of at least a decode threshold of new slice names in accordance with the dispersed storage error coding function.

10. The DS module of claim 6, wherein the fourth module functions to instruct to link by:

instructing a first storage node of the storage nodes to update a first slice location table to link a first new slice name of the one or more sets of at least a decode threshold of new slice names to a first slice name of the one or more sets of slice names for a first encoded data slice of the one or more sets of encoded data slices; and instructing a second storage node of the storage nodes to update a second slice location table to link a second new slice name of the one or more sets of at least a decode threshold of new slice names to a second slice name of the one or more sets of slice names for a second encoded data slice of the one or more sets of encoded data slices.

* * * * *